United States Patent
Chou et al.

(10) Patent No.: US 12,504,895 B1
(45) Date of Patent: Dec. 23, 2025

(54) DEVICE OF ENCRYPTION AND DECRYPTION AND METHOD FOR PROCESSING DATA

(71) Applicant: MACRONIX International Co., Ltd., Hsinchu (TW)

(72) Inventors: You-Liang Chou, Taichung (TW); Wen-Che Tsai, Hualien (TW)

(73) Assignee: MACRONIX International Co., Ltd., Hsinchu (TW)

( * ) Notice: Subject to any disclaimer, the term of this patent is extended or adjusted under 35 U.S.C. 154(b) by 0 days.

(21) Appl. No.: 18/931,068

(22) Filed: Oct. 30, 2024

Related U.S. Application Data

(60) Provisional application No. 63/663,185, filed on Jun. 24, 2024.

(51) Int. Cl.
   G06F 3/06 (2006.01)

(52) U.S. Cl.
   CPC .......... G06F 3/0622 (2013.01); G06F 3/0655 (2013.01); G06F 3/0679 (2013.01)

(58) Field of Classification Search
   CPC ...... G06F 3/064; G06F 3/0622; G06F 3/0655; G06F 3/0679; G06F 12/1408; G06F 21/72
   USPC ........................................................ 711/164
   See application file for complete search history.

(56) References Cited

U.S. PATENT DOCUMENTS

| | | | |
|---|---|---|---|
| 2012/0127793 A1 | 5/2012 | Lindsay et al. | |
| 2015/0007337 A1 | 1/2015 | Krutzik | |
| 2019/0036704 A1* | 1/2019 | DeVetter | H04L 9/14 |
| 2022/0189527 A1* | 6/2022 | Kim | G11C 11/40603 |
| 2024/0184875 A1* | 6/2024 | Zitlaw | G06F 21/44 |

FOREIGN PATENT DOCUMENTS

| | | |
|---|---|---|
| CN | 105097003 | 11/2015 |
| CN | 112687307 | 4/2021 |
| CN | 114664341 | 6/2022 |

OTHER PUBLICATIONS

Zijian Zhao et al., "In-Situ Encrypted NAND FeFET Array for Secure Storage and Compute-in-Memory", 2023 International Electron Devices Meeting (IEDM), Feb. 2024, pp. 1-4.
"Office Action of Taiwan Counterpart Application", issued on Jul. 24, 2025, p. 1-p. 24.

* cited by examiner

*Primary Examiner* — Hashem Farrokh
(74) *Attorney, Agent, or Firm* — J.C. PATENTS

(57) ABSTRACT

Disclosed are a device for encryption and decryption and a method for processing data. The device may be implemented by a memory device with a three-dimensional NAND flash memory with high capacity and high performance. The device includes a memory array, a data-sensing circuit, and a memory controller. A memory block in the memory array includes a first memory string with a first bit-line and a second memory string with a second bit-line. The memory controller is configured to: obtain a codec key, wherein memory cells in a first memory sub-area are set according to the codec key, and memory cells in a second memory sub-area are programed according to a complementary codec key; generate bit-line voltages of the first and the second bit-lines according to an input data; bias the memory cells in the first and the second memory sub-areas; and, obtain an output data according to the data-sensing circuit.

27 Claims, 14 Drawing Sheets

DEVICE OF ENCRYPTION AND DECRYPTION AND METHOD FOR PROCESSING DATA

CROSS-REFERENCE TO RELATED APPLICATION

This application claims the priority benefit of U.S. provisional application Ser. No. 63/663,185, filed on Jun. 24, 2024. The entirety of the above-mentioned patent application is hereby incorporated by reference herein and made a part of this specification.

BACKGROUND

Technical Field

The present disclosure relates to a corresponding technology applied to a memory device (such as a NAND flash memory), and in particular to a device for encryption and decryption and a method for processing data.

Description of Related Art

High-capacity and high-performance integrated circuit memories including 3D NAND flash memory are in continuing development in the hope of using 3D stacking technology and triple-level cells (TLC) to reduce the size of memory cells and increase data storage density, thereby helping to expedite development of applications related to memory devices. On the other hand, the principle of physically unclonable function (PUF) technology lies in process variability which allows components manufactured through semiconductor processes to generate highly random and unpredictable data. The data has uniqueness and may be used for identity verification, device security key, communication security and other purposes.

Memory devices may be used to store or transmit data, and may improve data security through encryption and decryption technology. Data encryption and decryption technology needs to be implemented based on codec key, and physically unclonable function (PUF) technology may generate PUF data as codec key. Therefore, how to implement data encryption and decryption technology based on memory devices is one of the issues to be overcome.

SUMMARY

The present disclosure provides a device for encryption and decryption and a method for processing data, which implements mutual exclusive OR (XOR)/exclusive NOR (NXOR) operation based on the codec key and input data through the existing hardware structure (such as memory string) in the memory device, thereby achieving encoding or decoding of data.

In the disclosure, a device for encryption and decryption includes a memory array, a data-sensing circuit, a bit-line voltage supplier and a memory controller. The memory array includes a memory block. The memory block includes a first memory string with a first bit-line and a second memory string with a second bit-line. The first memory string and the second memory string include a plurality of memory cells, and the memory cells are divided into a plurality of memory areas. The data-sensing circuit is coupled to the first memory string and the second memory string. The bit-line voltage supplier is coupled to the first bit-line and the second bit-line. The memory controller is coupled to the memory block. The memory controller is configured to: obtain a codec key, wherein memory cells in a first memory sub-area of a default memory area are set according to the codec key, and memory cells in a second memory sub-area of the plurality of memory areas are programed according to a complementary codec key; obtain an input data; generate bit-line voltages of the first bit-line and the second bit-line according to the input data, wherein the bit-line voltage of the first bit-line is different from the bit-line voltage of the second bit-line; bias the memory cells in the first memory sub-area and the second memory sub-area; and, obtain an output data according to the data-sensing circuit.

In the disclosure, the method for processing data includes the following steps: providing a memory block, wherein the memory block includes a first memory string with a first bit-line and a second memory string with a second bit-line, the first memory string and the second memory string include a plurality of memory cells, and the memory cells are divided into a plurality of memory areas; obtaining a codec key, wherein memory cells in a first memory sub-area of a default memory area are set according to the codec key, and memory cells in a second memory sub-area of the plurality of memory areas are programed according to a complementary codec key; obtaining an input data; generating bit-line voltages of the first bit-line and the second bit-line according to the input data, wherein the bit-line voltage of the first bit-line is different from the bit-line voltage of the second bit-line; biasing the memory cells in the first memory sub-area and the second memory sub-area; and, obtaining an output data according to the data-sensing circuit, wherein the data-sensing circuit is coupled to the first memory string and the second memory string.

In the disclosure, a device for encryption and decryption includes a memory array, a plurality of current sensing amplifiers and a memory controller. The memory array includes a memory block, wherein the memory block includes a first memory sub-block and a second memory sub-block, the first memory sub-block includes a plurality of first memory strings and the second memory sub-block includes a plurality of second memory strings, one of the first memory strings and one of the second memory strings are connected and share one of a plurality of bit lines, the first memory string and the second memory string include a plurality of memory cells, and the memory cells are divided into a plurality of memory areas. A plurality of current sensing amplifiers are respectively coupled to the bit lines. The memory controller is coupled to the memory array. The memory controller is configured to: obtain a codec key, wherein memory cells in the first memory area of the first memory sub-block are set according to the codec key, and memory cells in the second memory area of the second memory sub-block are programmed according to a complementary codec key; obtain an input data, wherein memory cells in the third memory area of the first memory sub-block are programmed according to the input data, and memory cells in the fourth memory area of the second memory sub-block are programmed according to a complementary input data; bias the memory cells in the first memory area and the memory cells in the third memory area of the first memory sub-block, and simultaneously bias the memory cells in the second memory area and the memory cells in the fourth memory area of the second memory sub-block; and, obtain an output data according to the current sensing amplifier.

In the disclosure, a method for processing data includes the following steps: providing a memory block, wherein the memory block includes a first memory sub-block and a second memory sub-block, and the first memory sub-block includes a plurality of first memory strings and the second memory sub-block includes a plurality of second memory strings, one of the first memory strings and one of the second memory strings are connected and share one of a plurality of bit lines, the first memory string and the second memory string include a plurality of memory cells, and the memory cells are divided into a plurality of memory areas; obtaining a codec key, wherein memory cells in the first memory area of the first memory sub-block are set according to the codec key, and memory cells in the second memory area of the second memory sub-block are programmed according to a complementary codec key; obtaining an input data, wherein memory cells in the third memory area of the first memory sub-block are programmed according to the input data, and memory cells in the fourth memory area of the second memory sub-block are programmed according to a complementary input data; biasing the memory cells in the first memory area and the memory cells in the third memory area of the first memory sub-block, and simultaneously biasing the memory cells in the second memory area and the memory cells in the fourth memory area of the second memory sub-block; and, obtaining an output data according to the current sensing amplifier, wherein the current sensing amplifier is coupled to the bit lines respectively.

Based on the above, the device for encryption and decryption and the method for processing data in the embodiments of the present disclosure configure the codec key, input data and corresponding complements respectively in the corresponding memory cells of the memory string architecture in the memory array, or configure them on the bit-line voltages of the corresponding memory strings, and use the data-sensing circuit to sense the current values on these memory strings to perform computing in memory (CIM), thereby achieving large-scale parallelism (e.g., it may be 8 kB per memory sub-block/per page) and fine-grained data encoding/decoding technology. The aforementioned codec key may be implemented through the PUF data generated by the physically unclonable function (PUF) processing operation of the memory array without transmitting the codec key. In addition, the aforementioned PUF data does not need to be stored in a specific area (i.e., there is no storage overhead), but may be generated or invoked through the aforementioned PUF processing operation when performing the aforementioned encoding/decoding operation.

DESCRIPTION OF THE EMBODIMENTS

Figure 1:
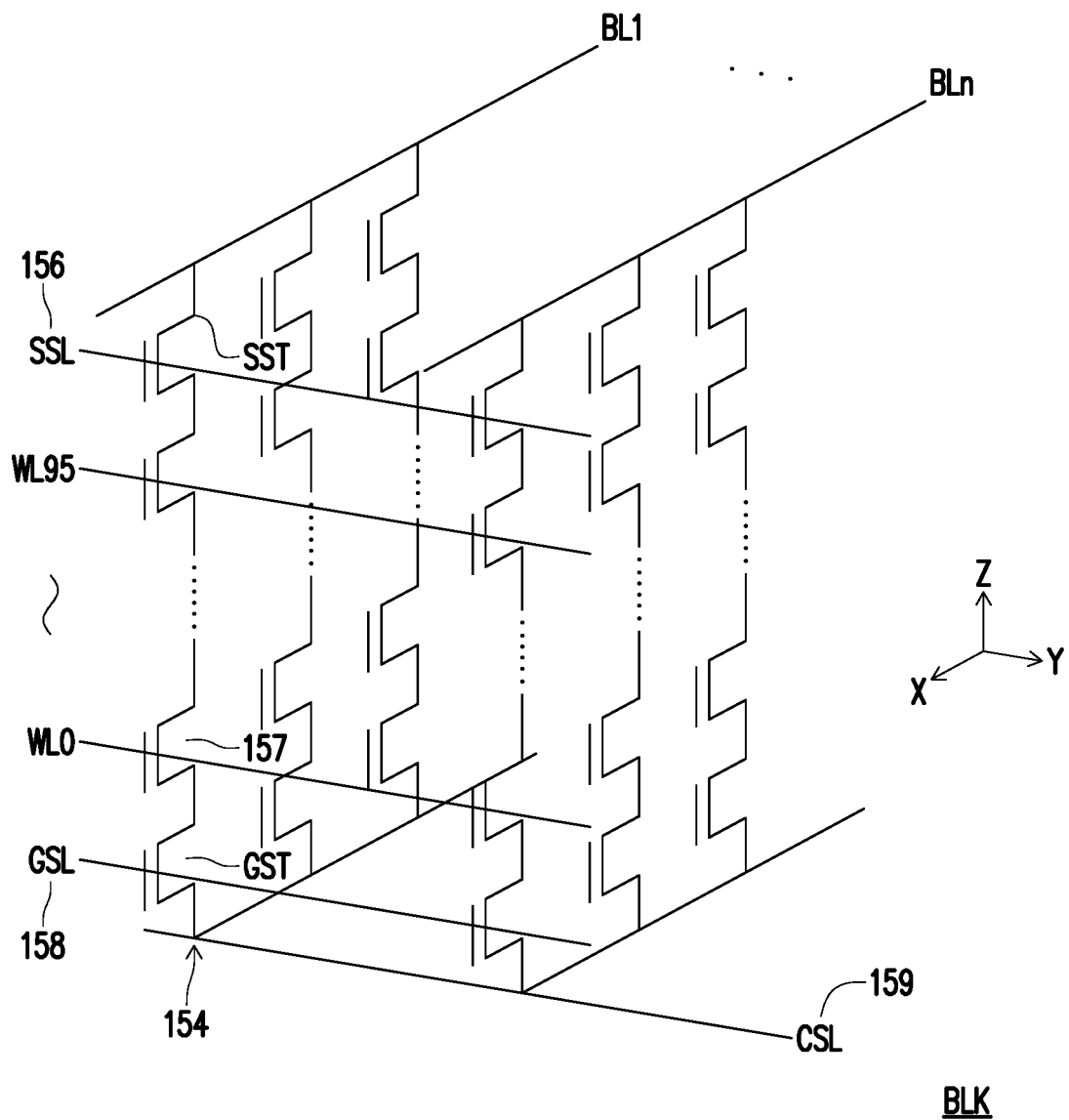
FIG. 1 is a schematic structural diagram of a memory block BLK in a three-dimensional memory chip according to an embodiment of the present disclosure.

FIG. 1 is a schematic structural diagram of a memory block BLK in a three-dimensional memory chip according to an embodiment of the present disclosure. Referring to FIG. 1, a three-dimensional memory chip may include one or more memory blocks. FIG. 1 shows one of the memory blocks BLK. The memory block BLK includes a plurality of word lines (e.g., word lines WL0 to WL95) and n bit lines BL1 to BLn, and n is a positive integer. The memory block BLK includes a plurality of memory cells, and the memory cells are configured in three dimensions, for example, a XYZ coordinate system. Taking the memory cell 157 in FIG. 1 as an example, the memory cell 157 is coupled to the corresponding word line WL0 and bit line BL1.

The word lines WL0 to WL95 formed by a conductive layer or a word line layer and the plurality of memory cells coupled thereto are divided into a plurality of pages. Memory cells on the same layer (same page) may be coupled to the same word line (e.g., word line WL0 or WL95) and obtain corresponding word line voltages. In other words, a page in the memory block BLK is composed of memory cells connected to a corresponding one of a plurality of word lines (for example, one of word lines WL0 to WL95) in the memory strings. Each page may be connected to a corresponding contact point in the driving circuit, such as a scan driver, through one of the word lines WL0 to WL95 coupled to the page. Each line has a corresponding voltage driver, and the voltage drivers may be controlled by the memory controller 440 or corresponding hardware. The plurality of memory cells in the memory string 154 belong to different pages.

Each memory string (e.g., a memory string 154) includes a plurality of memory cells connected in series vertically along the Z direction. The memory string 154 includes a plurality of memory cells (e.g., memory cells 157), a string selection transistor SST coupled to a string selection line SSL 156, and a ground selection transistor GST coupled to a ground selection line GSL 158. The memory string 154 is connected to one or more drivers, such as data drivers. The memory cell 157 is connected to the common source line CSL 159 via the ground selection transistor GST. The string selection line SSL 156 may be a conductive line or a conductive layer formed on top of each page (or word line layer). The memory block BLK may include a plurality of string selection lines SSL 156 on the top page. The ground selection line GSL 158 may be a conductive line or a conductive layer formed on the bottom of each page (or word line layer). The common source line CSL 159 may be a conductive layer or a plurality of conductive lines formed under the ground selection line GSL 158 and on the substrate of the three-dimensional memory chip. Several dummy lines or corresponding layers (not shown) may also be provided between the string selection line SSL 156 and the uppermost page, or between the ground selection line GSL 158 and the lowermost page.

The memory cells in the memory block BLK may belong to single-level memory cells (SLC) or multi-level memory cells. A multi-level memory cell is, for example, one of a multi-level memory cell (MLC), a triple-level memory cell (TLC), and a quad-level memory cell (QLC). The embodiment of the present disclosure does not limit the type of memory cells in the memory block BLK.

Figure 2A:
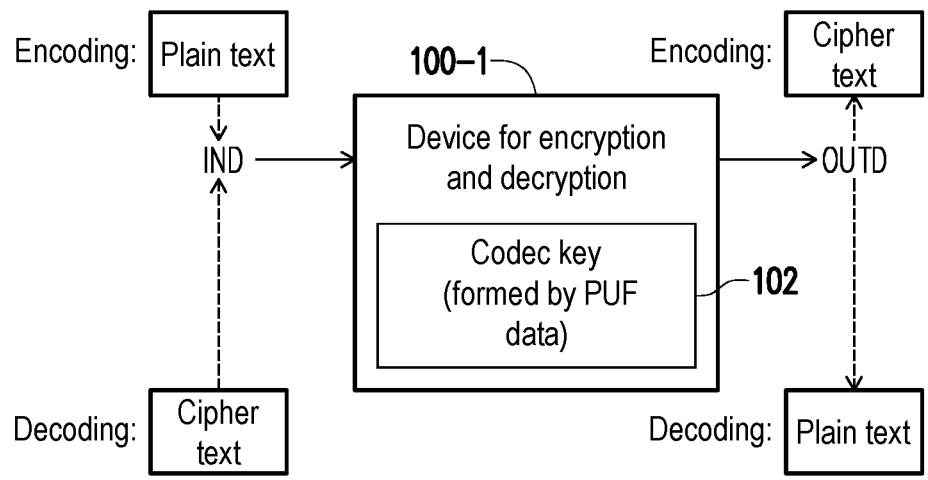
FIG. 2A and FIG. 2B are schematic diagrams of a device for encryption and decryption according to an embodiment of the present disclosure.
Figure 2B:
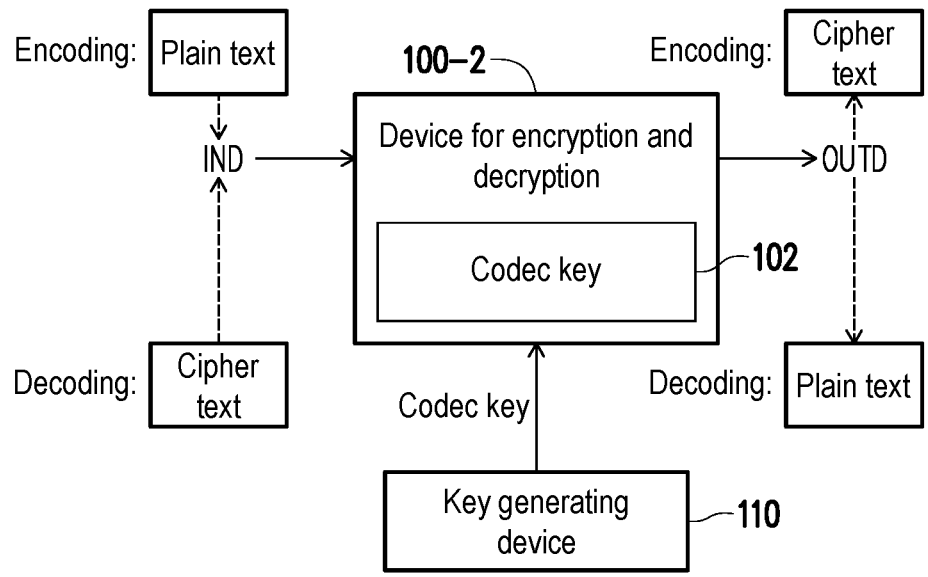

The embodiment of the present disclosure uses the device provided with the memory block BLK in FIG. 1 to implement the device for encryption and decryption and method for processing data. FIG. 2A and FIG. 2B are schematic diagrams of devices 100-1 and 100-2 for encryption and decryption according to an embodiment of the present disclosure. The devices 100-1 and 100-2 for encryption and decryption both receive the input signal IND, and perform encoding or decoding operations on the input signal IND based on the codec key 102 to generate an output data OUTD.

The encoding operation or decoding operation in this embodiment is implemented based on logical operations (such as XOR operation or XNOR operation). In other words, the output data OUTD of this embodiment is the result of performing an XOR operation or an XNOR operation on the codec key 102 and the input data IND. When the devices 100-1 and 100-2 for encryption and decryption perform encoding operations, the input signal IND is unencoded data (referred to as plain text), and the output data is encoded data (referred to as cipher text). On the other hand, when the devices 100-1 and 100-2 for encryption and decryption perform decoding operations, the input signal IND is encoded data (cipher text), and the output data OUTD is unencoded data (plain text).

The difference between the devices 100-1 and 100-2 for encryption and decryption lies in the way of obtaining the codec key 102. The device 100-1 for encryption and decryption in FIG. 2A may generate PUF data by performing PUF processing operations on specific areas of its own memory block, and generate a corresponding codec key 102 based on this PUF data. The PUF processing operation may be one of a gate-induced drain leakage (GIDL) erase operation, a program interference operation, a program disturbance operation, a read interference operation, a read disturbance operation, a program delay operation, and an erase delay operation. The codec key 102 in the device 100-2 for encryption and decryption in FIG. 2B may be obtained from an external key generating device 110 and stored in the memory block of the device 100-2 for encryption and decryption in FIG. 2B. The key generating device 110 in FIG. 2B may generate the codec key 102 through a variety of methods. For example, the codec key 102 is generated by using the PUF data generated by performing a PUF processing operation on its own memory block, or the codec key 102 is generated by other key generating technologies.

Figure 3A:
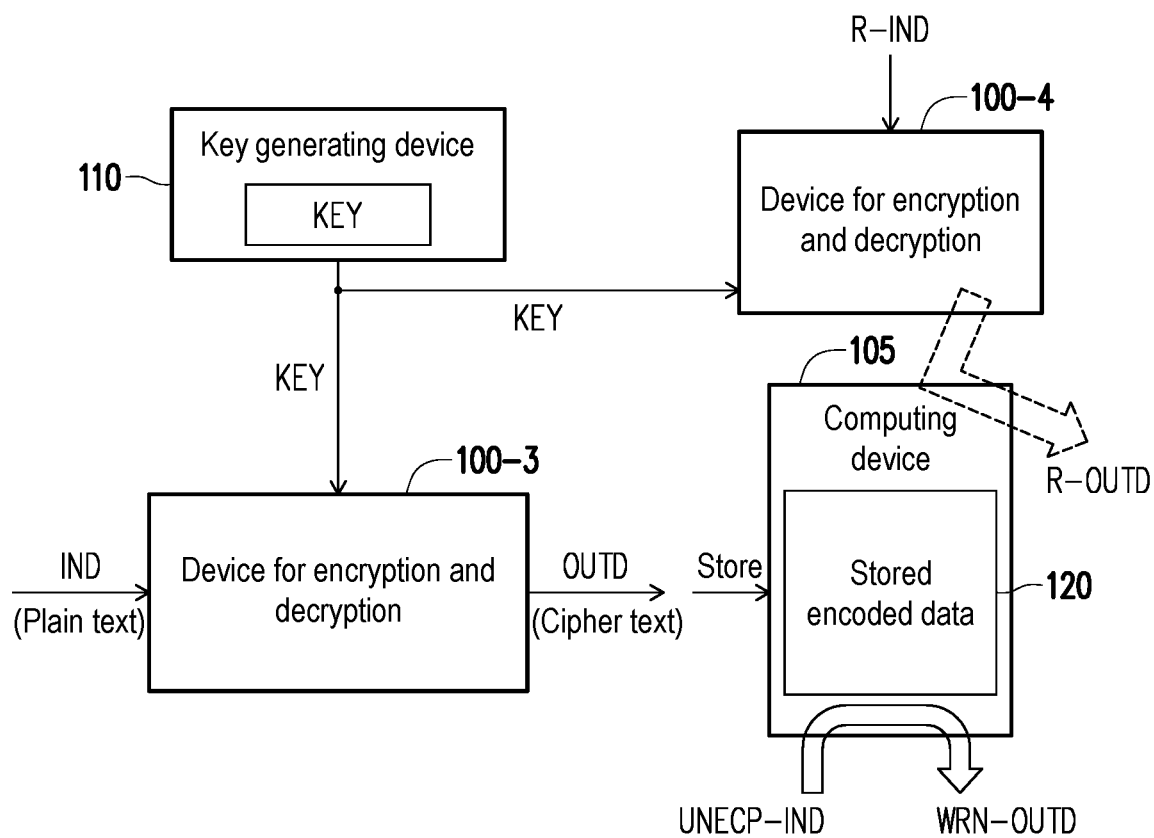
FIG. 3A and FIG. 3B are schematic diagrams illustrating the application between the device for encryption and decryption and the computing device according to an embodiment of the present disclosure.
Figure 3B:
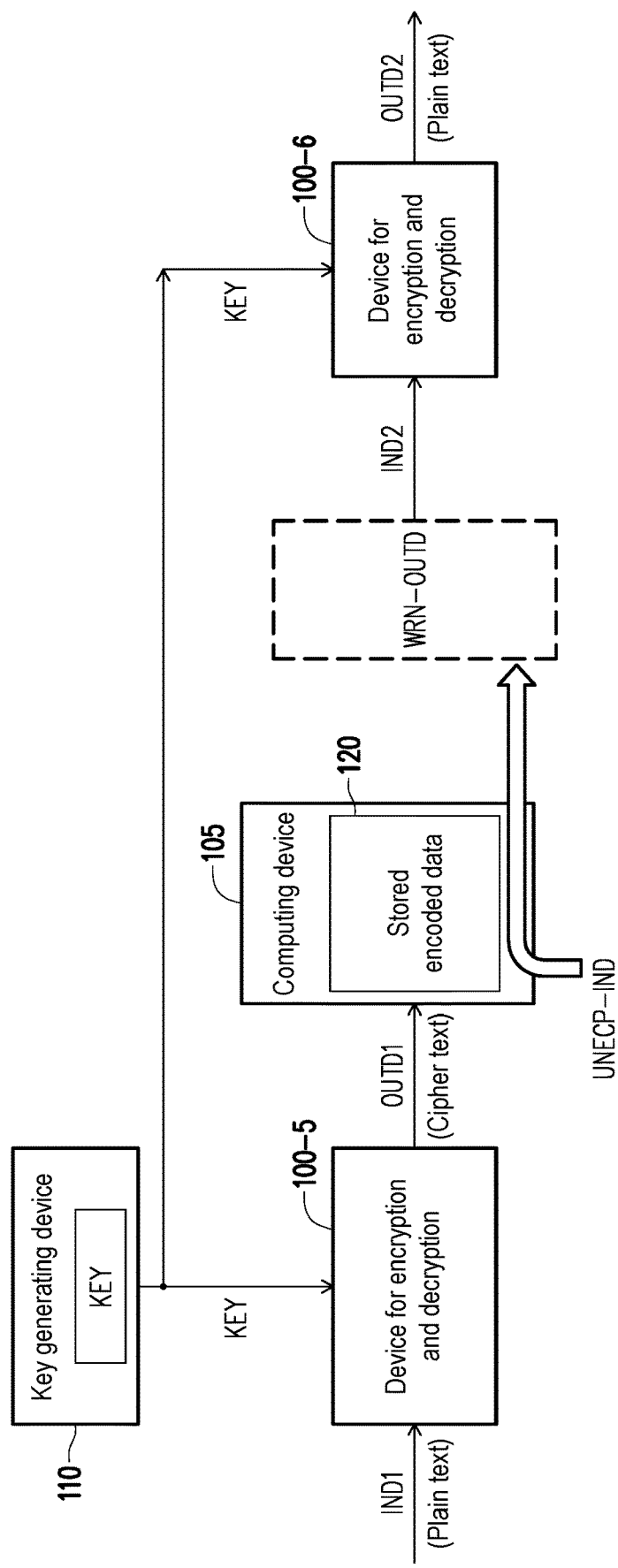

FIG. 3A and FIG. 3B are schematic diagrams illustrating the application between the devices 100-3 to 100-6 for encryption and decryption and the computing device 105 according to an embodiment of the present disclosure. The devices 100-3 to 100-6 for encryption and decryption in this embodiment may be devices equipped with a memory array, and may be designed as a pluggable device interface (for example, a device for encryption and decryption in the form of a flash drive), so that it is convenient for users to plug and play when they need to implement encoding and decoding operations. The computing device 105 in FIG. 3A and FIG. 3B may be a multiply-accumulate device used to implement a multiply-accumulate (MAC) operation. The computing device 105 further includes a storage device to store encoded data 120.

In FIG. 3A, the device 100-3 for encryption and decryption performs encoding operations on the input data IND as plain text through its own codec key KEY, or the codec key KEY provided by the key generating device 110, so as to generate the output data OUTD as cipher text. The computing device 105 stores the output data OUTD generated by the device 100-3 for encryption and decryption as the stored encoded data 120. In other words, the output data OUTD is a result of encryption by the device 100-3. If other data is subsequently input to the computing device 105, the output of computing device 105 will depend on whether the data has been encrypted.

If the computing device 105 is coupled to the device 100-4 for encryption and decryption, the computing device 105 uses the device 100-4 for encryption and decryption to make the raw input data R-IND to perform the decoding operation based on the aforementioned codec key KEY, and then the computing device 105 generates the raw output data R-OUTD. In other words, the computing device 105 obtains the raw output data R-OUTD based on the device 100-4 for encryption and decryption with the codec key KEY. When the computing device 105 performs calculations, it must performs the encryption and decryption process of the encryption and decryption device 100-4 with the raw input data R-IND, and then been calculated by the computing device 105 to produce the aforementioned calculated result (e.g., the raw output data R-OUTD). If the input data IND and the raw input data R-IND are going through the same encryption and decryption devices 100-3 and 100-4, and if the encryption and decryption devices 100-3 and 100-4 are the same, then the calculated results calculated by the computing device 105 will also be the same as the results when the input data IND and the raw input data R-IND are directly sent to the computing device 105 for calculation. Therefore, the raw output data R-OUTD may also be called the correct output data.

Correspondingly, in the case where the computing device 105 obtains the unencoded input data UNECP-IND, and under the circumstances that the computing device 105 is not coupled to the device 100-4 for encryption and decryption, or the codec key KEY used by the device 100-4 for encryption and decryption is not the codec key KEY used by the device 100-3 for encryption and decryption, either one of the above situations will cause the result (i.e., the output data WRN-OUTD) of arithmetic operations based on unencoded input data UNECP-IND unable to be the same as the raw output data R-OUTD. Accordingly, the output data WRN-OUTD is the wrong output data.

In FIG. 3A, if the codec key KEY used by the device 100-3 for encryption and decryption is generated by the PUF data generated by the device 100-3 for encryption and decryption itself, then the device 100-4 for encryption and decryption and the device 100-3 for encryption and decryption must be the same device, because the codec key KEY generated in the device 100-3 for encryption and decryption based on its own PUF data will be different from the codec key KEY generated in the device 100-4 for encryption and decryption based on its own PUF data.

In FIG. 3B, the device 100-5 for encryption and decryption performs an encoding operation on the input data IND1 as plain text through its own codec key KEY, or the codec key KEY provided by the key generating device 110, so as to generate the output data OUTD1 as cipher text. The computing device 105 stores the output data OUTD generated by the device 100-5 for encryption and decryption as the stored encoded data 120.

The computing device 105 performs calculation based on the input content to generate an output of the computing device 105. If the input content is the output data OUTD1 as cipher text or the stored encoded data 120, the data generated after the calculation of the computing device 105 (for example, the input data IND2) is still as cipher text. If the input data IND2 as the cipher text is not processed by the device 100-6 for encryption and decryption, it will become the output data WRN-OUTD that has not been decrypted, and therefore is a wrong output data. If the input data IND2 as cipher text needs to be decrypted, the input data IND2 needs to be processed by the device 100-6 for encryption and decryption with the codec key KEY to generate the output data OUTD2 as plain text. Under the condition where the codec keys KEY are the same and the devices 100-5 and 100-6 for encryption and decryption are the same, the output data OUTD2 as plain text will be the same as the input data IND1 as plain text.

On the other hands, in the case where the computing device 105 obtains the unencoded input data UNECP-IND, the result (i.e., the output data WRN-OUTD) generated by the computing device 105 based on the input data UNECP-IND and the stored encoded data 120 has not been decrypted, and therefore is the wrong output data. The output data WRN-OUTD can be processed by the device 100-6 for encryption and decryption, to generate the output data OUTD2 as plain text. The output data OUTD2 will be the correct results generated by the computing device 105 according to the decrypted input data (which going through the device100-5 for encryption and decryption not shown in FIG. 3B) and the stored encoded data 120. Likewise, the output data OUTD2 will be the correct results generated by the computing device 105 based on the raw input data (which has not been decrypted and may be the input data UNECP-IND, in other words, the data is not going through the device 100-5 for encryption and decryption) and the input data IND1 (not shown in FIG. 3B).

In FIG. 3B, if the codec key KEY used by the device 100-5 for encryption and decryption is generated by the PUF data generated by the device 100-5 for encryption and decryption itself, then the device 100-5 for encryption and decryption and the device 100-6 for encryption and decryption must be the same device, because the codec key KEY generated in the device 100-5 for encryption and decryption based on its own PUF data will be different from the codec key KEY generated in the device 100-6 for encryption and decryption based on its own PUF data.

The devices 100-1 to 100-6 for encryption and decryption in FIG. 2A to FIG. 2B and FIG. 3A to FIG. 3B may be implemented by a variety of circuit hardware and methods. Each embodiment of the present disclosure will be described in detail below.

Figure 4:
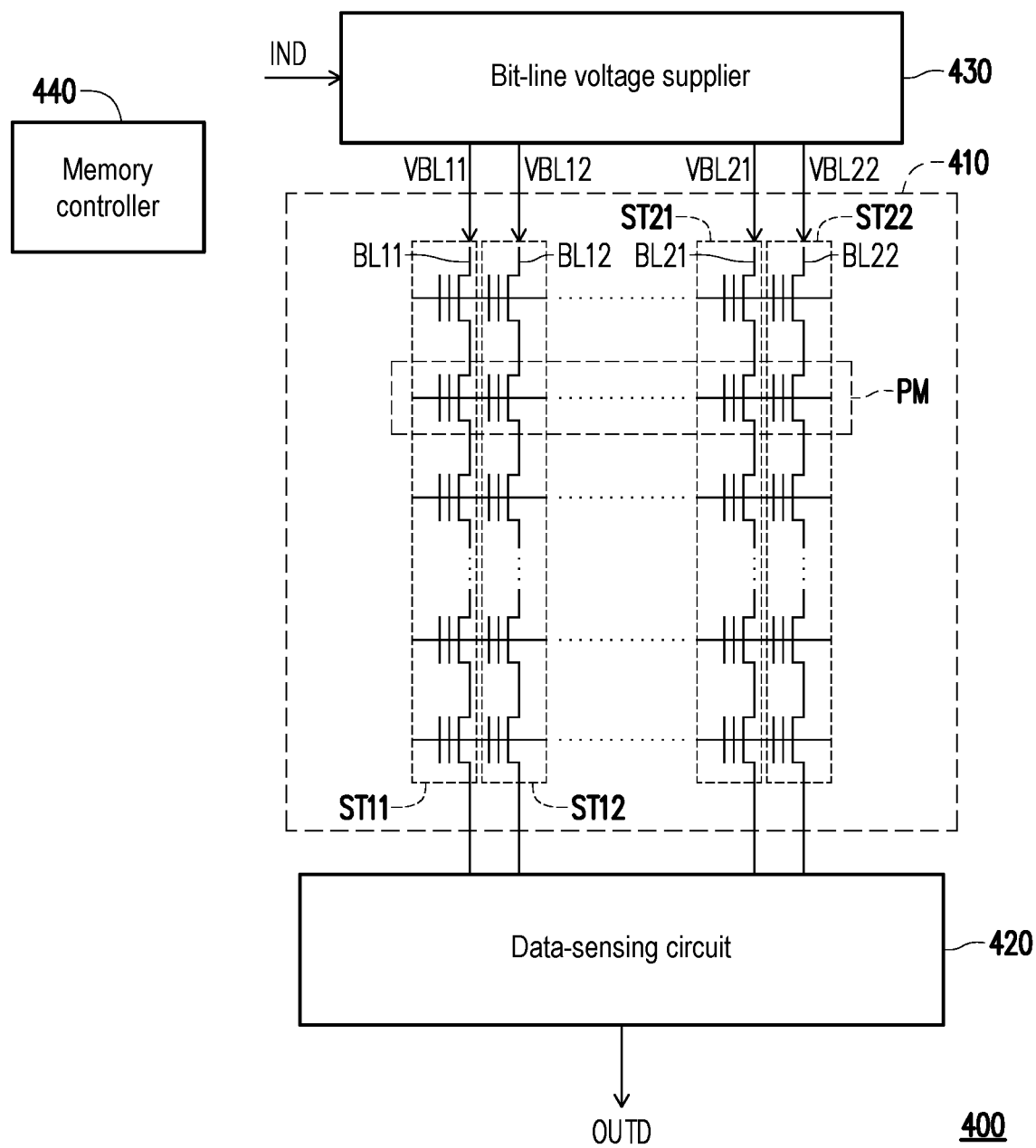
FIG. 4 is a block diagram of a device for encryption and decryption according to the first embodiment of the present disclosure.

FIG. 4 is a block diagram of a device 400 for encryption and decryption according to the first embodiment of the present disclosure. The device 400 for encryption and decryption includes a memory array 410, a data-sensing circuit 420, a bit-line voltage supplier 430 and a memory controller 440. The memory array 410 may include one or more memory blocks (such as memory block BLK in FIG. 1). The memory block includes a first memory string (e.g., memory string ST11) with a first bit-line (e.g., bit line BL11) and a second memory string (e.g., memory string ST12) with a second bit-line (e.g., bit line BL12). The first memory string and the second memory string include a plurality of memory cells, and the memory cells are divided into a plurality of memory areas (e.g., a plurality of pages). The page PM in FIG. 4 is an example of a memory area (i.e., one page).

In FIG. 4, the memory array 410 includes a plurality of memory strings ST11 to ST12, ST21 to ST22 and a plurality of bit lines BL11 to BL12 and BL21 to BL22. This embodiment uses two memory strings (for example, memory strings ST11 and ST12 adjacent to each other) and corresponding bit lines (for example, bit lines BL11 to BL12) as a set of memory strings as an example to further illustrate the corresponding operations. This embodiment may perform corresponding operations on a plurality of groups of memory strings simultaneously, thereby realizing large-scale parallel data encoding/decoding technology.

The data-sensing circuit 420 is coupled to the first memory string ST11 and the second memory string ST12. The bit-line voltage supplier is coupled to the first bit-line BL11 and the second bit-line BL12. The memory controller 440 is coupled to the memory block 410, the data-sensing circuit 420, and the bit-line voltage supplier 430.

Figure 5:
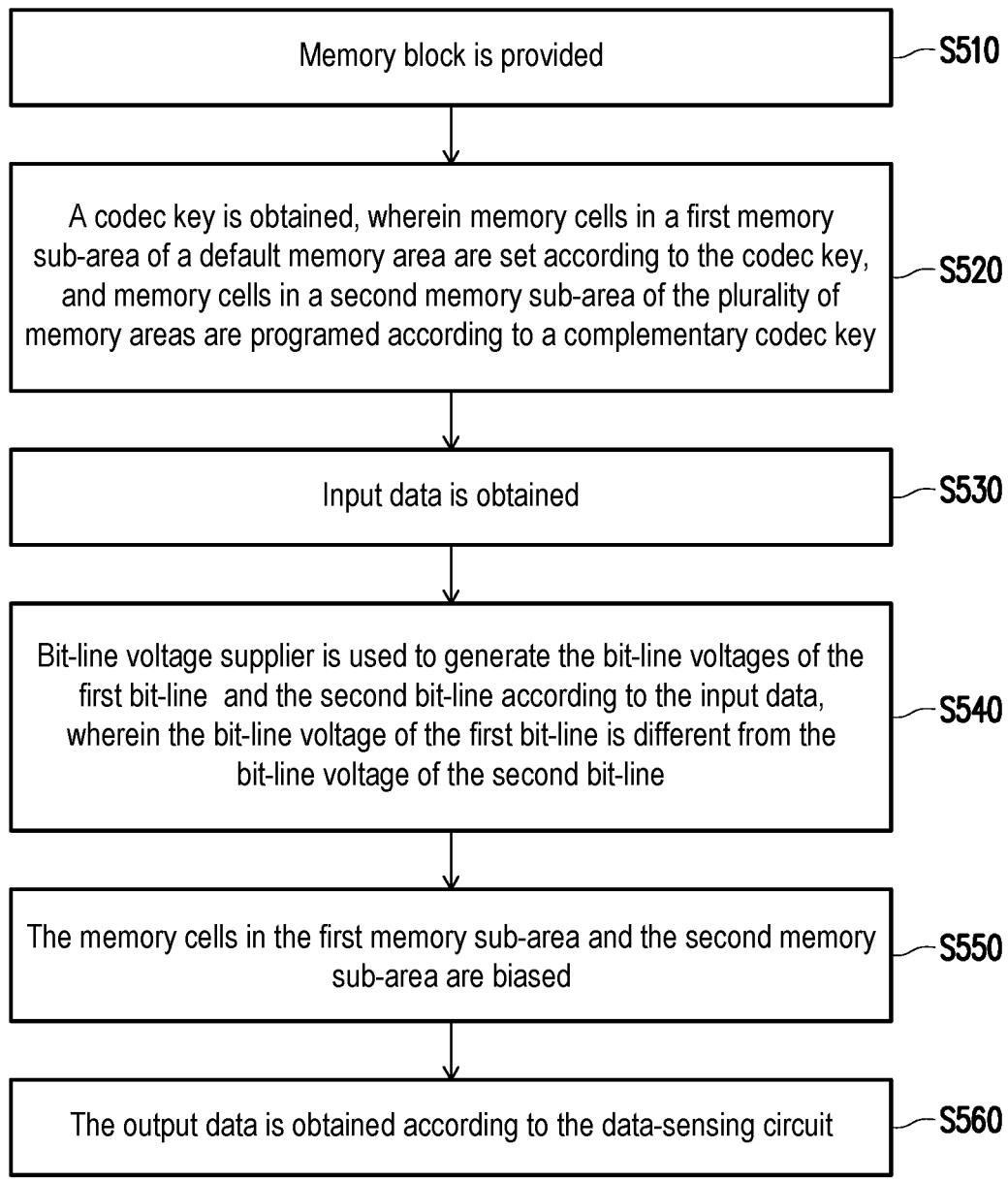
FIG. 5 is a flow chart of a method for processing data according to an embodiment of the present disclosure.

Please refer to FIG. 5 for the operations and method flow that are implementable by the memory controller 440. FIG. 5 is a flow chart of a method for processing data according to an embodiment of the present disclosure. The method of FIG. 5 is applied to the device 400 for encryption and decryption in FIG. 4.

In step S510, a memory block (e.g., memory block BLK in FIG. 1) is provided. In step S520, the memory controller 440 obtains the codec key KEY. The memory controller 440 may perform a physically unclonable function (PUF) processing operation from a specific area in the memory block (such as a default page or a part of an area of a default page) to generate PUF data in the aforementioned specific area, and generate the codec key KEY based on the PUF data. Alternatively, the codec key KEY may be generated according to the key generating device, and the codec key KEY may be transmitted from the key generating device to the memory controller 440 of the device 400 for encryption and decryption.

After obtaining the codec key KEY, the memory controller 440 sets the memory cells in the first memory sub-area of the default memory area (e.g., page PM) according to the codec key KEY. For example, the critical voltage value of the corresponding memory cell in the first memory sub-area is set based on the corresponding bit value of the codec key KEY. The aforementioned first memory sub-area is, for example, a set of odd-numbered bits in the page PM. Moreover, the memory controller 440 programs the memory cells in the second memory sub-area of the default memory area according to the complementary codec key (that is, the complement of the codec key KEY). For example, the complementary codec key is calculated based on the codec key KEY, and the critical voltage value of the corresponding memory cell in the second memory sub-area is set based on the corresponding bit value of the complementary codec key. The aforementioned second memory sub-area is, for example, a set of even-numbered bits in the page PM. In this way, the critical voltage value of the memory cell in each memory string and located in the default memory area (e.g., page PM) will be set or programmed based on the codec key KEY or the complement of the codec key KEY. In other words, the complementary codec key and codec key KEY are stored in a complementary manner.

In step S530, the memory controller 440 obtains the input data IND from the outside or the computing device 105 in FIG. 2. In step S540, the memory controller 440 uses the bit-line voltage supplier 430 to generate the bit-line voltages of the first bit-line (e.g., bit line BL11) and the second bit-line (e.g., bit line BL12) according to the input data IND. The bit-line voltage VBL11 of the first bit-line BL11 is different from the bit-line voltage VBL12 of the second bit-line BL12.

In step S550, the memory controller 440 bias the memory cells in the first memory sub-area (for example, the set of odd-numbered bits in the page PM) and the second memory sub-area (for example, the set of even-numbered bits in the page PM). For detailed implementation of step S550, please refer to the following FIG. 6 and corresponding embodiments for reference.

In step S560, the memory controller 440 obtains the output data OUTD according to the data-sensing circuit 420. In this embodiment, two memory strings (such as memory strings ST11 and ST12) are used to perform encoding/decoding operations to generate one bit in the data OUT. Specifically, the memory controller 440 sets or programs the codec key KEY and the corresponding complement in the corresponding memory cells in the page PM of the memory strings ST11 and ST12 (step S520), and sets the input data and the corresponding complement on the first bit-line BL11 and the second bit-line BL12 (step S530). Thereafter, through the architecture of the memory string and the biasing operation in step S540, the sum of the first current flowing through memory string ST11 and the second current in the memory string ST12 has the corresponding bit value of the output data OUTD.

Figure 6:
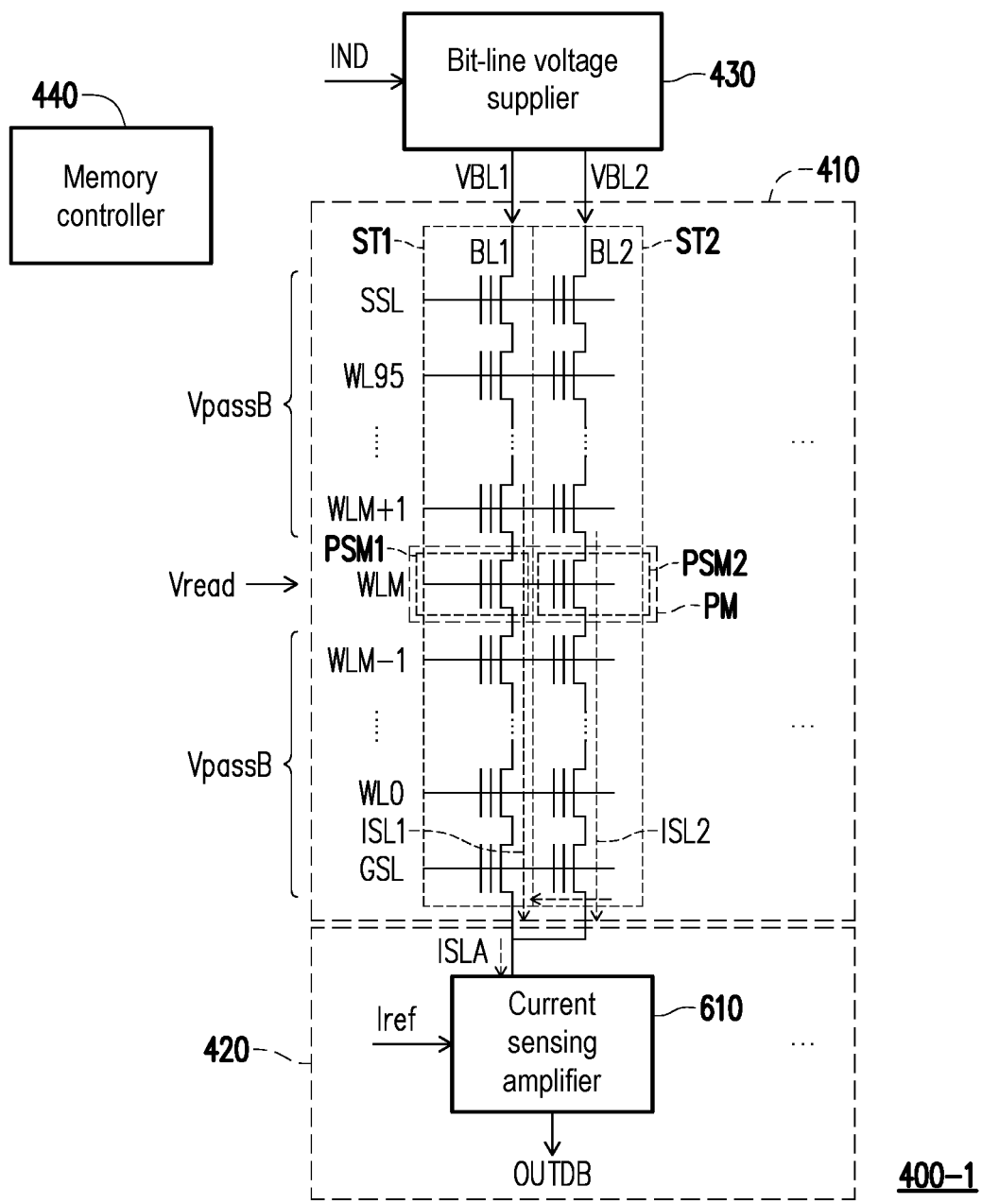
FIG. 6 is a detailed schematic diagram of a device for encryption and decryption according to the second embodiment of the present disclosure.

FIG. 6 is a detailed schematic diagram of a device 400-1 for encryption and decryption according to the second embodiment of the present disclosure. The device 400-1 for encryption and decryption in FIG. 6 is an embodiment of the device 400 for encryption and decryption in FIG. 4 in the first embodiment. The device 400-1 for encryption and decryption in FIG. 6 marks the first memory sub-area PSM1 (the set of odd-numbered bits in page PM) and the second memory sub-area PSM2 (the set of even-numbered bits in page PM) of the default memory area (page PM). In this embodiment, the first memory sub-area PSM1 and the second memory sub-area PSM2 are both located in the default memory area (page PM). Those who apply this embodiment may selectively dispose the first memory sub-area PSM1 and the second memory sub-area PSM2 in adjacent or non-adjacent positions according to their needs, as long as the current values of the two memory strings (such as memory strings ST1 and ST2) may be sensed and the encoding/decoding operation of this embodiment may be performed.

In step S520 of FIG. 5, the memory controller 440 sets the memory cells in the first memory sub-area PSM1 of the default memory area (page PM) according to the codec key KEY, and programs the memory cells in the second memory sub-area PSM2 according to the complementary codec key. Specifically, when the corresponding bit of the codec key KEY is the value "1" and the corresponding bit of the complementary codec key is the value "0", the critical voltage of the memory cells in the first memory sub-area PSM1 will be adjusted to the on state Vt-ON, and the critical voltage of the memory cells in the second memory sub-area PSM2 will be adjusted to the cut-off state Vt-OFF. When the corresponding bit of the codec key KEY is the value "0" and the corresponding bit of the complementary codec key is the value "1", the critical voltage of the memory cell in the first memory sub-area PSM1 will be adjusted to the cut-off state Vt-OFF, and the critical voltage of the memory cells in the second memory sub-area PSM2 will be adjusted to the on state Vt-ON.

When the critical voltage of the memory cells is the on state Vt-ON, and in step S550, the memory cells whose critical voltage is the on state Vt-ON may allow the current of the memory string to flow through. Relatively speaking, when the critical voltage of the memory cells is the cut-off state Vt-OFF, and in step S550, the memory cells whose critical voltage is the cut-off state Vt-OFF will be cut off without allowing the current of the memory string to flow through.

The details of step S540 in FIG. 5 may be illustrated in FIG. 6. The memory controller 440 generates bit-line voltages of the first bit-line (e.g., bit line BL1) and the second bit-line (e.g., bit line BL2) according to the input data IND through the bit-line voltage supplier 430. Specifically, when the corresponding bit value of the input data IND is the first value (for example, the value "0"), the first default voltage (for example, 2V) is applied to the first bit-line BL1 as the bit-line voltage VBL1 of the first bit-line BL1, and the second default voltage (e.g., 0V) is applied to the second bit-line BL2 as the bit-line voltage VBL2 of the second bit-line BL2. On the other hand, when the corresponding bit value of the input data IND is the second value (for example, the value "1"), the second default voltage (for example, 0V) is applied to the first bit-line BL1 as the bit-line voltage VBL1 of the first bit-line BL1, and the first default voltage (e.g., 2V) is applied to the second bit-line BL2 as the bit-line voltage VBL2 of the second bit-line BL2. The first preset voltage in this embodiment is 2V as an example. Person implemented this embodiment may adjust the value of the first preset voltage according to their needs. For example, the first preset voltage may be a value between 0.1V and 3V. Therefore, through the foregoing operations, the bit-line voltage VBL1 of the first bit-line BL1 is different from the bit-line voltage VBL2 of the second bit-line BL2.

The details of step S550 in FIG. 5 may be illustrated in FIG. 6. Biasing the memory cells in the first memory sub-area PSM1 and the second memory sub-area PSM2 through the memory controller 440 may include the following steps. The read bias voltage Vread is applied to the word line WLM of the default memory area (page PM). The pass voltage VpassB is applied to other word lines (i.e., word lines WL0 to WLM-1, WLM+1 to WL95) other than the word line WLM of the default memory area (page PM) in the memory block of the memory array 410. Furthermore, the pass voltage VpassB is applied to the string selection line SSL and the ground selection line GSL of the memory block.

In FIG. 6, the data-sensing circuit 420 includes a current sensing amplifier 610. The current sensing amplifier 610 is coupled to both the first memory string ST1 and the second memory string ST2. The current sensing amplifier 610 is configured to compare the reference current Iref with the sum (e.g., the sum current ISLA) of the first current ISL1 flowing through the first memory string ST1 and the second current ISL2 flowing through the second memory string ST2 to obtain the output data bit OUTDB.

Figure 7:
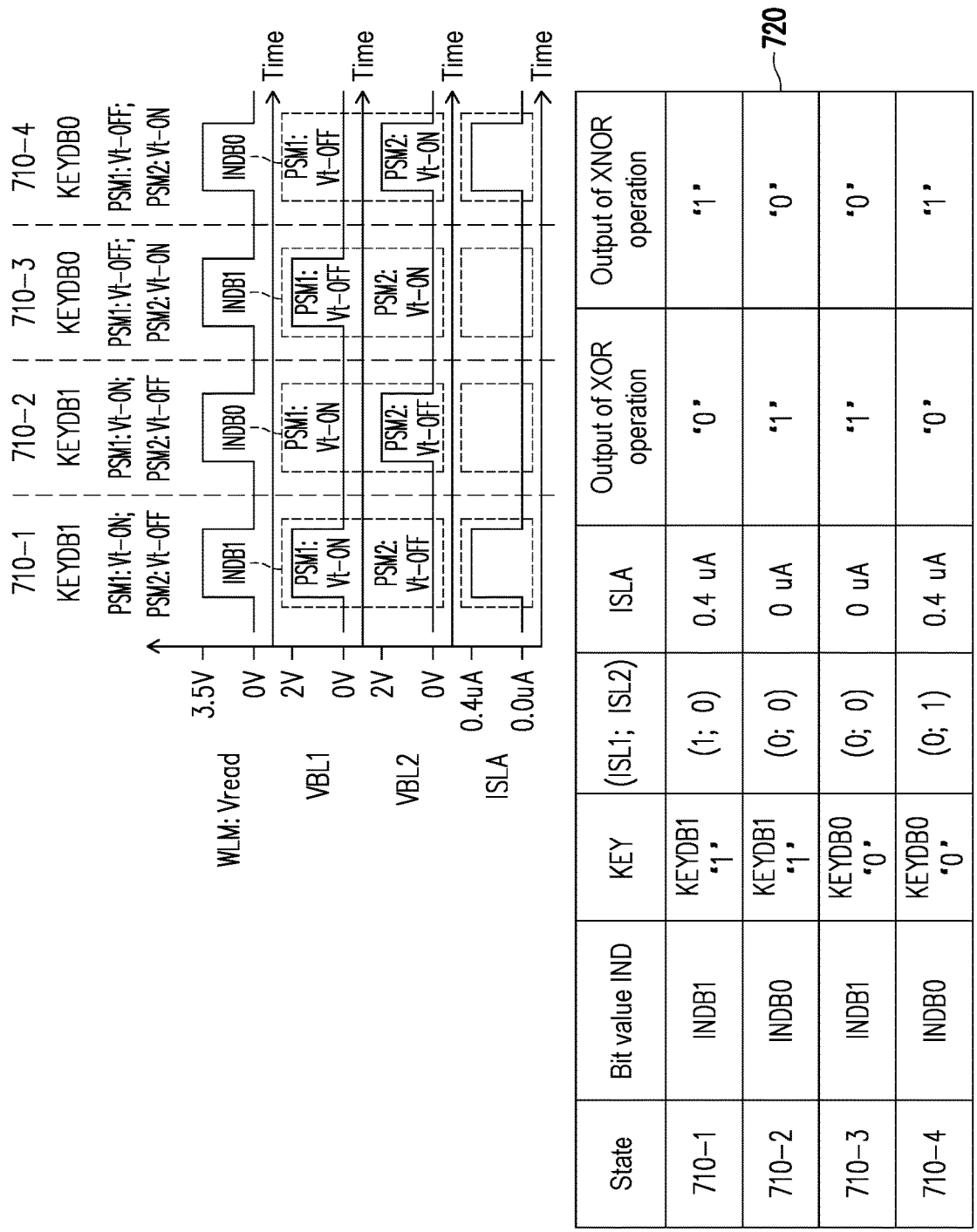
FIG. 7 is a schematic diagram of signals in the device for encryption and decryption in FIG. 6 according to the second embodiment of the present disclosure.

FIG. 7 is a schematic diagram of signals in the device 400-1 for encryption and decryption in FIG. 6 according to the second embodiment of the present disclosure. Here, there may be four states 710-1 to 710-4, which are categorized based on the corresponding bits of the codec key KEY (for example, the key bit KEYDB1 as the value "1" and the key bit KEYDB0 as the value "0") and the corresponding bits of the input data IND (for example, the input data bit INDB1 as the value "1" and the input data bit INDB0 as the value "0").

In FIG. 7, the state 710-1 corresponds to the key bit KEYDB1 as the value "1" and the input data bit INDB1 as the value "1". Based on the key bit KEYDB1 as the value "1", the critical voltage of the memory cells in the first memory sub-area PSM1 is set/programmed to the on state Vt-ON, and the critical voltage of the memory cells in the second memory sub-area PSM2 is set/programmed to the cut-off state Vt-OFF. Based on the input data bit INDB1 as the value "1", the bit-line voltage VBL1 on the bit line BL1 is set to the first default voltage (2V), and the bit-line voltage VBL2 on the bit line BL2 is set to the second default voltage (0V).

When the word line WLM of the current page PM is applied with the read bias voltage Vread, since the critical voltage of the memory cells in the first memory sub-area PSM1 is set/programmed to the on state Vt-ON, the first current ISL1 flowing through the first memory string ST1 is about 0.4 uA. On the other hand, since the critical voltage of the memory cells in the second memory sub-area PSM2 is set/programmed to the off state Vt-OFF, the second current ISL2 of the second memory string ST2 is unable to flow through; accordingly, the second current ISL2 is 0 uA. The sum current ISLA of the first current ISL1 and the second current ISL2 is about 0.4 uA. Therefore, if the encoding/decoding operation is an XOR operation, the corresponding bit of the output data OUTD generated under the state 710-1 in FIG. 7 in step S560 in FIG. 5 is "0". If the encoding/decoding operation is an XNOR operation, the corresponding bit of the output data OUTD generated under the state 710-1 in FIG. 7 in step S560 in FIG. 5 is "1".

In FIG. 7, the state 710-2 corresponds to the key bit KEYDB1 as the value "1" and the input data bit INDB0 as the value "0". Based on the key bit KEYDB1 as the value "1", the critical voltage of the memory cells in the first memory sub-area PSM1 is set/programmed to the on state Vt-ON, and the critical voltage of the memory cells in the second memory sub-area PSM2 is set/programmed to cut-off state Vt-OFF. Based on the input data bit INDB0 as the value "0", the bit-line voltage VBL1 on the bit line BL1 is set to the second default voltage (0V), and the bit-line voltage VBL2 on the bit line BL2 is set to the first default voltage (2V).

When the word line WLM of the current page PM is applied with the read bias voltage Vread, although the critical voltage of the memory cells in the first memory sub-area PSM1 is set/programmed to the on state Vt-ON to allow the first current ISL1 of the first memory string ST1 to flow through, since the bit-line voltage VBL1 is 0V, the first current ISL1 is 0 uA. On the other hand, since the critical voltage of the memory cells in the second memory sub-area PSM2 is set/programmed to the off state Vt-OFF, the second current ISL2 of the second memory string ST2 is unable to flow through; accordingly, the second current ISL2 is 0 uA. The sum current ISLA of the first current ISL1 and the second current ISL2 is about 0 uA. Therefore, if the encoding/decoding operation is an XOR operation, the corresponding bit of the output data OUTD generated under the state 710-2 in FIG. 7 in step S560 in FIG. 5 is "1". If the encoding/decoding operation is an XNOR operation, the corresponding bit of the output data OUTD generated under the state 710-2 in FIG. 7 in step S560 in FIG. 5 is "0".

By analogy, in FIG. 7, the state 710-3 corresponds to the key bit KEYDB0 as the value "0" and the input data bit INDB1 as the value "1". When the word line WLM of the current page PM is applied with the read bias voltage Vread, the first current ISL1 and the second current ISL2 are 0 uA and 0 uA respectively, and therefore the sum current ISLA is 0 uA. If the encoding/decoding operation is an XOR operation, the corresponding bit of the output data OUTD generated under the state 710-3 in FIG. 7 in step S560 in FIG. 5 is "1". If the encoding/decoding operation is an XNOR operation, the corresponding bit of the output data OUTD generated under the state 710-3 in FIG. 7 in step S560 in FIG. 5 is "0". In FIG. 7, the state 710-4 corresponds to the key bit KEYDB0 as the value "0" and the input data bit INDB0 as the value "0". When the word line WLM of the current page PM is applied with the read bias voltage Vread, the first current ISL1 is 0 uA and the second current ISL2 is about 0.4 uA (because the critical voltage of the memory cells in the second memory sub-area PSM2 is set/programmed to the on state Vt-ON, and the bit-line voltage VBL2 is 2V), and therefore the sum current ISLA is 0.4 uA. If the encoding/decoding operation is an XOR operation, the corresponding bit of the output data OUTD generated under the state 710-4 in FIG. 7 in step S560 in FIG. 5 is "0". If the encoding/decoding operation is an XNOR operation, the corresponding bit of the output data OUTD generated under the state 710-4 in FIG. 7 in step S560 in FIG. 5 is "1". It may be seen from the waveform diagram and truth table 720 of FIG. 7 that computing in memory may be implemented in the memory array through the hardware and steps of FIG. 4, FIG. 5 and FIG. 6, thereby encrypting/decrypting data.

Figure 8:
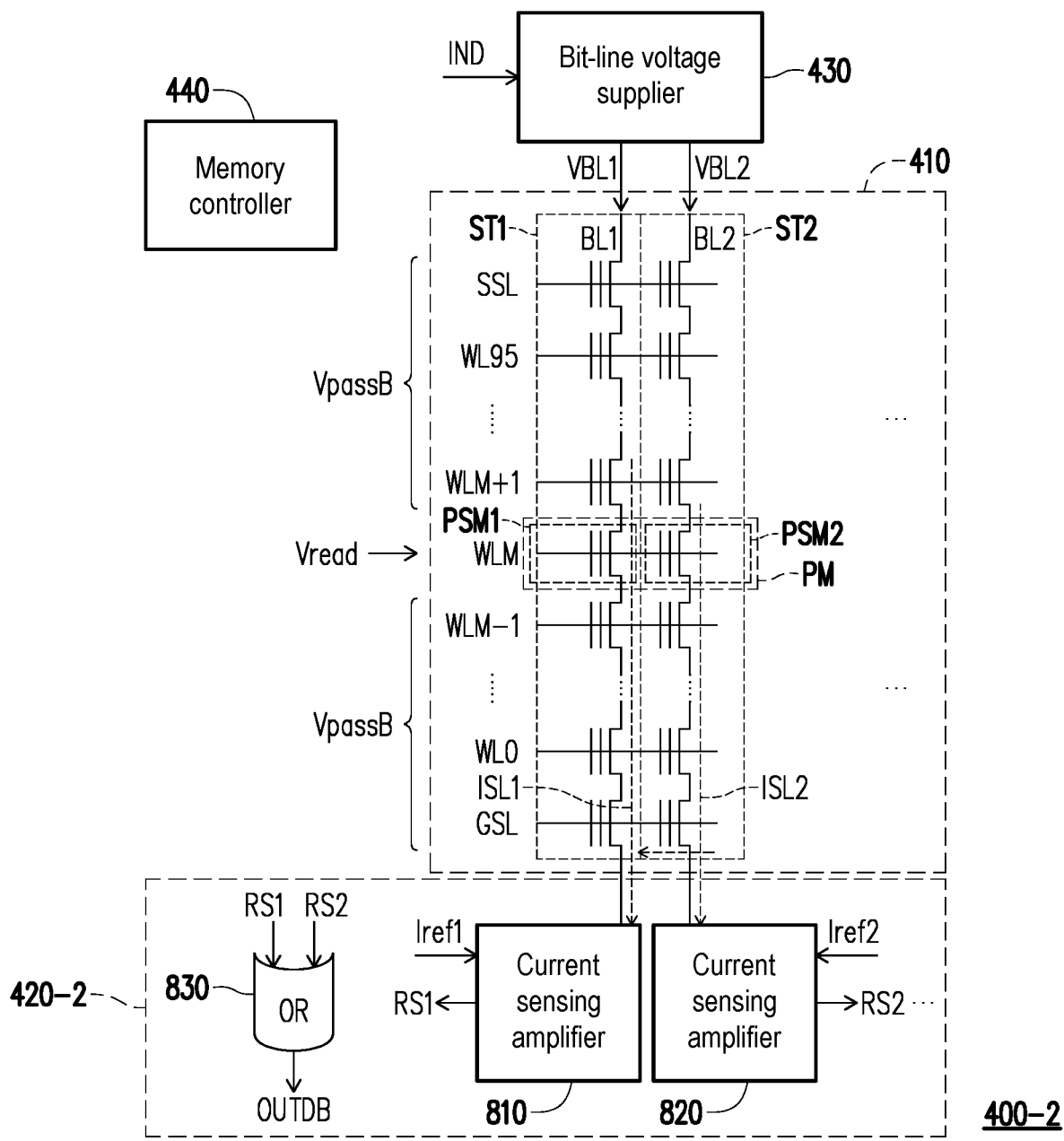
FIG. 8 is a detailed schematic diagram of a device for encryption and decryption according to the third embodiment of the present disclosure.

FIG. 8 is a detailed schematic diagram of a device for encryption and decryption according to the third embodiment of the present disclosure. The main difference between the device 400-2 for encryption and decryption in FIG. 8 and the device 400-1 for encryption and decryption in FIG. 6 in the second embodiment is that the circuit structure of the data-sensing circuit 420-2 in the device 400-2 for encryption and decryption in FIG. 8 is different from the circuit structure of the data-sensing circuit 420 in the device 400-1 for encryption and decryption in FIG. 6.

In FIG. 8, the data-sensing circuit 420-2 includes a first current sensing amplifier 810, a second current sensing amplifier 820 and a logic circuit 830. The first current sensing amplifier 810 is coupled to the first memory string ST1. The first current sensing amplifier 810 compares the first reference current Iref1 with the first current ISL1 flowing through the first memory string ST1 to obtain the first result RS1. The second current sensing amplifier 820 is coupled to the second memory string ST2. The second current sensing amplifier 820 compares the second reference current Iref2 with the second current ISL2 flowing through the second memory string ST2 to obtain the second result RS2.

When the encoding/decoding operation in this embodiment is an XNOR operation, the logic circuit includes an OR gate 830. The first input terminal of the OR gate 830 receives the first result RS1. The second input terminal of the OR gate 830 receives the second result RS2. The output node of the OR gate 830 generates the corresponding bit OUTDB of the output data according to the first result RS1 and the second result RS2. On the other hand, when the encoding/decoding operation of this embodiment is an XOR operation, the logic circuit includes an NOR gate.

Figure 9:
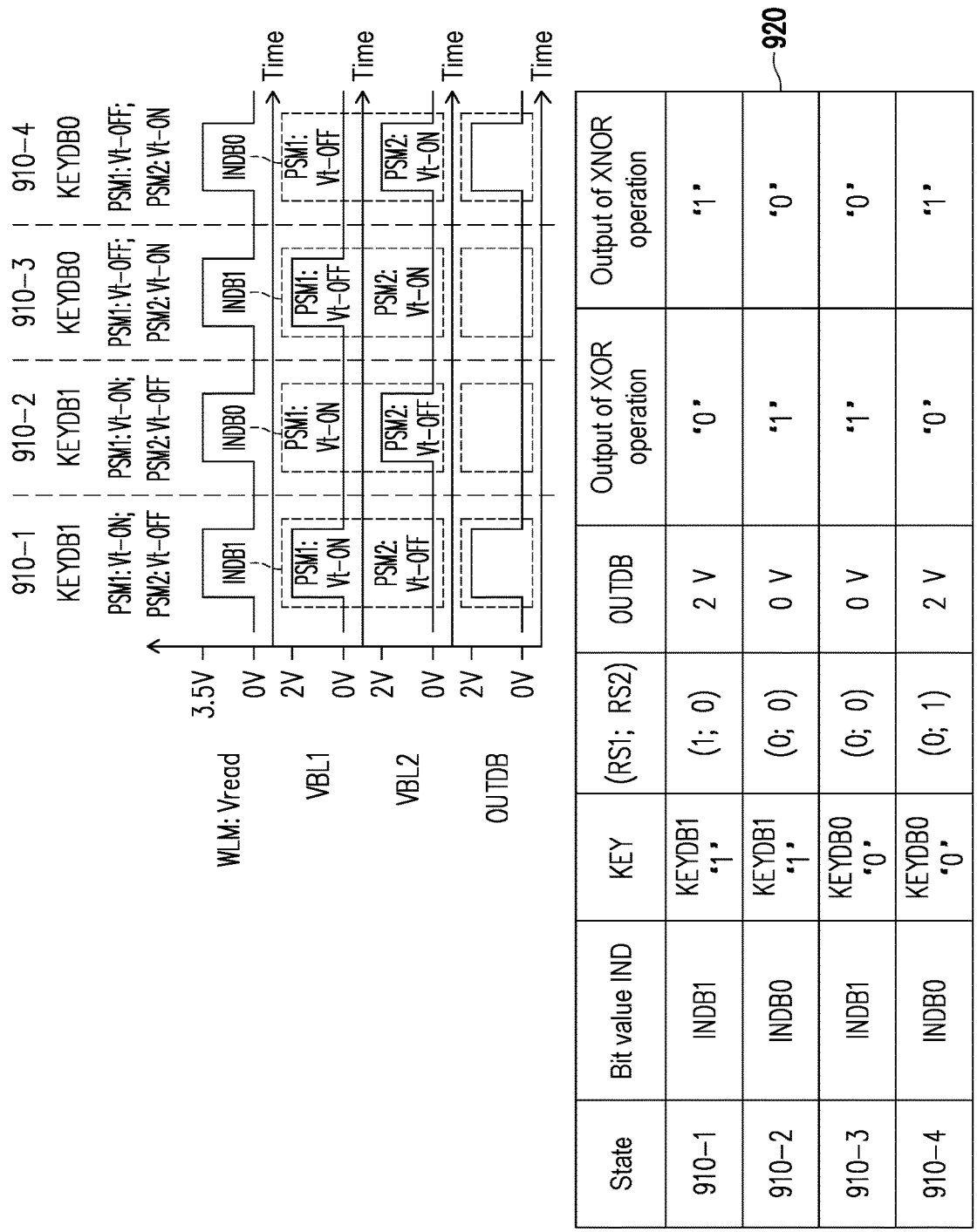
FIG. 9 is a schematic diagram of signals in the device for encryption and decryption in FIG. 8 according to the third embodiment of the present disclosure.

FIG. 9 is a schematic diagram of signals in the device for encryption and decryption in FIG. 8 according to the third embodiment of the present disclosure. Here, there may be four states 910-1 to 910-4, which are categorized based on the corresponding bits of the codec key KEY (for example, the key bit KEYDB1 as the value "1" and the key bit KEYDB0 as the value "0") and the corresponding bits of the input data IND (for example, the input data bit INDB1 as the value "1" and the input data bit INDB0 as the value "0"). The states 910-1 to 910-4 in FIG. 9 respectively correspond to states 710-1 to 710-4 in FIG. 7. The main difference between FIG. 7 and FIG. 9 is that, since the data-sensing circuit 420-2 of FIG. 8 is different from the data-sensing circuit 420 of FIG. 6, the first current ISL1, the second current ISL2 and the sum current ISLA of FIG. 7 are respectively adjusted to the first result RS1, the second result RS2 and the corresponding bit OUTDB of the output data in FIG. 9.

As can be seen from FIG. 9, the first result RS1, the second result RS2 and the corresponding bit OUTDB of the output data in FIG. 9 are similar to the first current ISL1, the second current ISL2 and the sum current ISLA in FIG. 7. The main difference between them lies in whether they are presented as voltages or currents. In detail, in FIG. 9, the state 910-1 corresponds to the key bit KEYDB1 as the value "1" and the input data bit INDB1 as the value "1". When the word line WLM of the current page PM is applied with the read bias voltage Vread, the first result RS1 is a value "1" (the current value of the first current ISL1 is greater than the first reference current value Iref1), and the second result RS2 is a value "0" (the current value of the second current ISL2 is less than the second reference current value Iref2). Therefore, the voltage of the output data bit OUTDB is 2V, which is represented as the value "1". Therefore, if the encoding/decoding operation is an XOR operation, the corresponding bit of the output data OUTD generated under the state 910-1 in FIG. 9 in step S560 in FIG. 5 is "0". If the encoding/decoding operation is an XNOR operation, the corresponding bit of the output data OUTD generated under the state 910-1 in FIG. 9 in step S560 in FIG. 5 is "1".

In FIG. 9, the state 910-2 corresponds to the key bit KEYDB1 as the value "1" and the input data bit INDB0 as the value "0". When the word line WLM of the current page PM is applied with the read bias voltage Vread, the first result RS1 is a value "0" (the current value of the first current ISL1 is less than the first reference current value Iref1), and the second result RS2 is a value "0" (the current value of the second current ISL2 is less than the second reference current value Iref2). Therefore, the voltage of the output data bit OUTDB is 0V, which is represented as the value "0". Therefore, if the encoding/decoding operation is an XOR operation, the corresponding bit of the output data OUTD generated under the state 910-2 in FIG. 9 in step S560 in FIG. 5 is "1". If the encoding/decoding operation is an XNOR operation, the corresponding bit of the output data OUTD generated under the state 910-2 in FIG. 9 in step S560 in FIG. 5 is "0".

In FIG. 9, the state 910-3 corresponds to the key bit KEYDB0 as the value "0" and the input data bit INDB1 as the value "1". When the word line WLM of the current page PM is applied with the read bias voltage Vread, the first result RS1 is a value "0" (the current value of the first current ISL1 is less than the first reference current value Iref1), and the second result RS2 is a value "0" (the current value of the second current ISL2 is less than the second reference current value Iref2). Therefore, the voltage of the output data bit OUTDB is 0V, which is represented as the value "0". Therefore, if the encoding/decoding operation is an XOR operation, the corresponding bit of the output data OUTD generated under the state 910-3 in FIG. 9 in step S560 in FIG. 5 is "1". If the encoding/decoding operation is an XNOR operation, the corresponding bit of the output data OUTD generated under the state 910-3 in FIG. 9 in step S560 in FIG. 5 is "0".

In FIG. 9, the state 910-4 corresponds to the key bit KEYDB0 as the value "0" and the input data bit INDB0 as the value "0". When the word line WLM of the current page PM is applied with the read bias voltage Vread, the first result RS1 is a value "0" (the current value of the first current ISL1 is less than the first reference current value Iref1), and the second result RS2 is a value "1" (the current value of the second current ISL2 is greater than the second reference current value Iref2). Therefore, the voltage of the output data bit OUTDB is 2V, which is represented as the value "1". Therefore, if the encoding/decoding operation is an XOR operation, the corresponding bit of the output data OUTD generated under the state 910-4 in FIG. 9 in step S560 in FIG. 5 is "0". If the encoding/decoding operation is an XNOR operation, the corresponding bit of the output data OUTD generated under the state 910-4 in FIG. 9 in step S560 in FIG. 5 is "1". It may be seen from the waveform diagram and truth table 920 of FIG. 9 that computing in memory may be implemented in the memory array through the hardware and steps of FIG. 4, FIG. 5 and FIG. 8, thereby encrypting/decrypting data.

Figure 10:
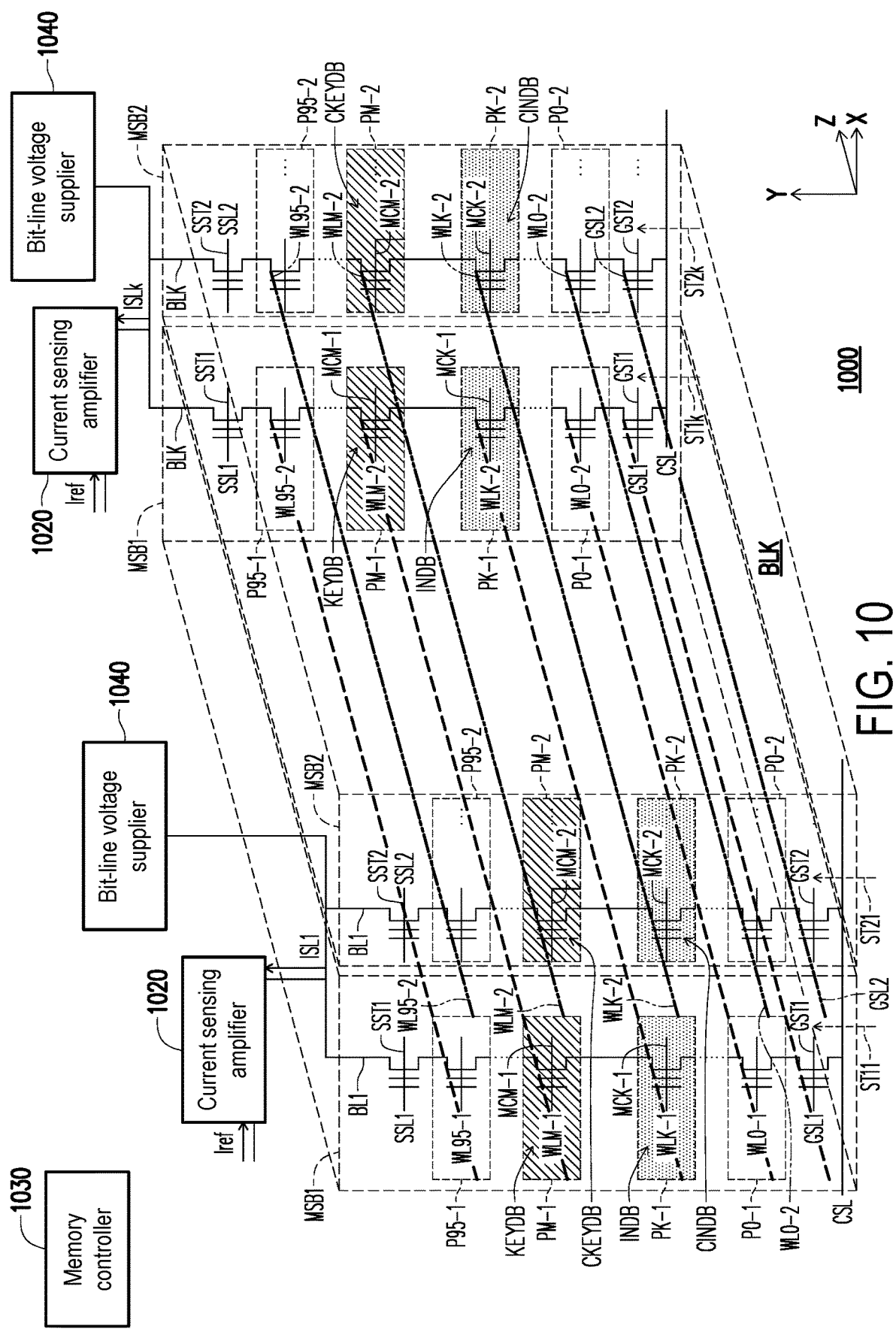
FIG. 10 is a block diagram of a device for encryption and decryption according to the fourth embodiment of the present disclosure.

FIG. 10 is a block diagram of a device 1000 for encryption and decryption according to the fourth embodiment of the present disclosure. The device 1000 for encryption and decryption includes a memory array, a plurality of current sensing amplifiers (e.g., current sensing amplifier 1020) and a memory controller 1030. Each current sensing amplifier 1020 is coupled to the corresponding bit lines BL1 to BL respectively. The memory controller 1030 is coupled to the memory array.

The memory array may include one or more memory blocks (such as memory block BLK). The memory block BLK includes a first memory sub-block (e.g., memory sub-block MSB1) and a second memory sub-block (e.g., memory sub-block MSB2). The memory sub-blocks MSB1 and MSB2 in this embodiment refer to the memory sub-blocks composed of a plurality of memory cells on the YZ plane, and each memory sub-block includes a plurality of memory strings. For example, the memory sub-block MSB1 includes a plurality of memory strings ST11 to ST1*k*, and the memory sub-block MSB2 includes a plurality of memory strings ST21 to ST2*k*. In this embodiment, the number of memory strings in each memory sub-block may be 16 kB.

In this embodiment, one of the first memory strings and one of the second memory strings are connected and share one of the plurality of bit lines. For example, the memory string ST11 and the memory string ST21 are connected and share the bit line BL1, and the memory string ST1*k* and the memory string ST2*k* are connected and share the bit line BL*k*. The first memory strings ST11 to ST1*k* and the second memory strings ST21 to ST2*k* respectively include a plurality of memory cells, and the memory cells are divided into a plurality of memory areas (for example, pages P0-1 to P95-1, P0-2 to P95-2).

Figure 11:
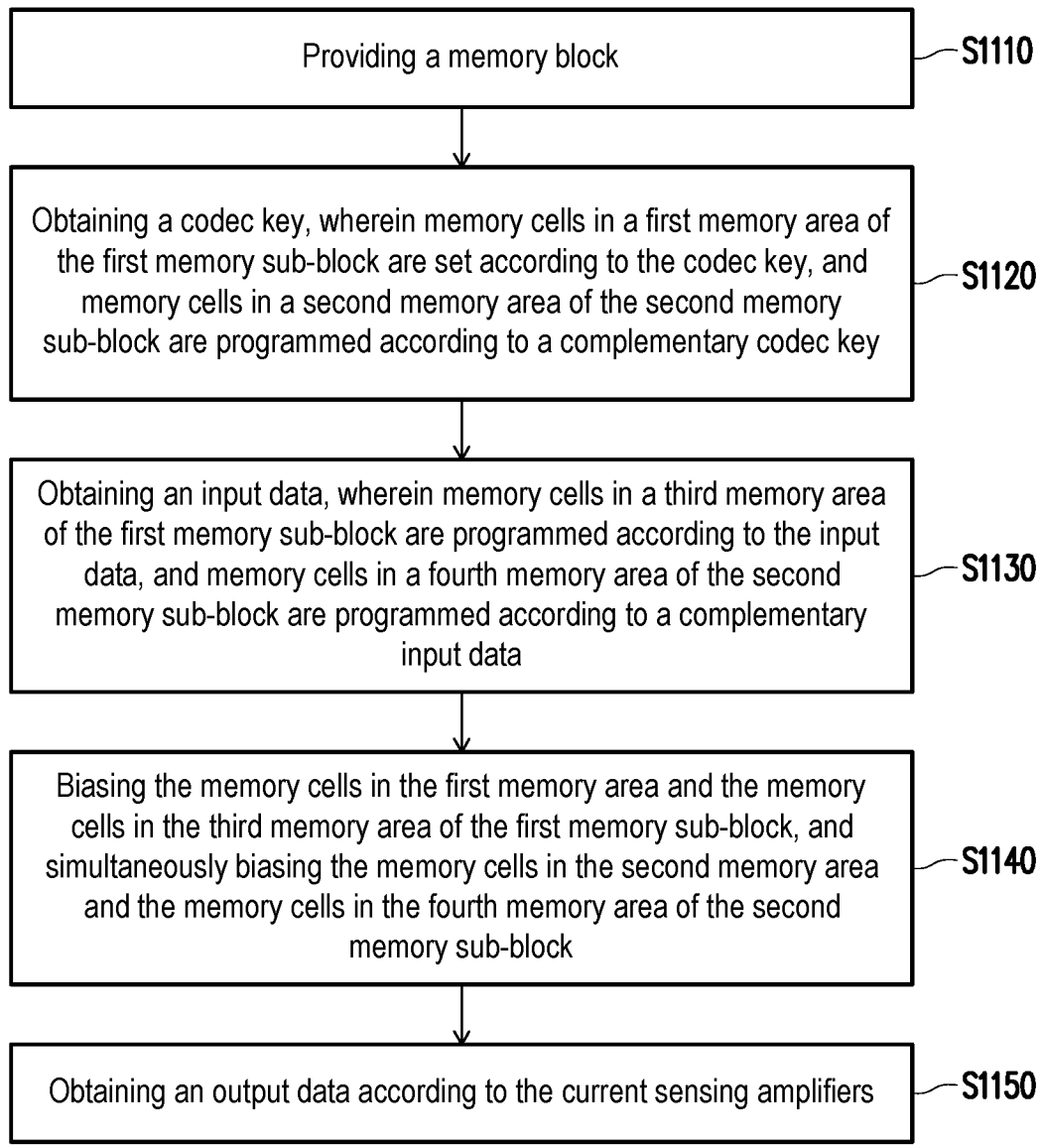
FIG. 11 is a flow chart of a method for processing data according to the fourth embodiment of the present disclosure.

Please refer to FIG. 11 for the operations and method flow that are implementable by the memory controller 1030. FIG. 11 is a flow chart of a method for processing data according to the fourth embodiment of the present disclosure. The method of FIG. 11 is applied to the device 1000 for encryption and decryption in FIG. 10.

Please refer to FIG. 10 and FIG. 11 at the same time. In step S1110, a memory block (e.g., the memory block BLK in FIG. 10) is provided. In step S1120, the memory controller 1030 obtains the codec key KEY. The memory controller 1030 may perform PUF processing operations from a specific area in the memory block (such as a default page or a part of an area of a default page) to generate PUF data, and generate the codec key KEY based on the PUF data. Alternatively, the codec key KEY may be generated according to the key generating device, and the codec key KEY may be transmitted from the key generating device to the memory controller 1030 of the device 1000 for encryption and decryption.

After obtaining the codec key KEY, the memory controller 1030 sets the memory cell MCM-1 in the first memory area (e.g., page PM-1) of the first memory sub-block (e.g., memory sub-block MSB1) according to the codec key KEY. For example, the critical voltage value of the corresponding memory cell MCM-1 of the page PM-1 in the first memory sub-area MSB1 is set based on the corresponding bit value KEYDB of the codec key KEY. Moreover, the memory controller 1030 programs the memory cell MCM-2 in the second memory area (e.g., page PM-2) of the second memory sub-block (e.g., memory sub-block MSB2) according to the complementary codec key (i.e., the complement of codec key KEY). For example, the complementary codec key is calculated based on the codec key KEY, and the critical voltage value of the corresponding memory cell MCM-2 of the page PM-2 in the second memory sub-area MSB2 is set based on the corresponding bit value CKEYDB of the complementary codec key. In this way, the critical voltage value of the memory cells MCM-1 to MCM-2 in each memory string and located in the first memory area (page PM-1) or the second memory area (page PM-2) will be set or programmed based on the codec key or the complement of the codec key KEY In step S1130, the memory controller 1030 obtains the input data IND from the outside or the computing device 105 in FIG. 2. After obtaining the input data IND, the memory controller 1030 programs the memory cell MCK-1 in the third memory area (e.g., page PK-1) of the first memory sub-block (e.g., memory sub-block MSB1) according to the input data IND. For example, the critical voltage value of the corresponding memory cell MCK-1 in the third memory area (page PK-1) is set based on the corresponding bit value INDB of the input data IND. Furthermore, the memory controller 1030 programs the memory cell MCK-2 in the fourth memory sub-area (e.g., page PK-2) of the second memory sub-block (e.g., memory sub-block MSB2) according to the complementary input data (i.e., the complement of the input data IND). For example, the critical voltage value of the corresponding memory cell MCK-2 in the fourth memory area (page PK-2) is set based on the corresponding bit value CINDB of the complement of the input data IND. In this way, the critical voltage value of the memory cells MCK-1 to MCK-2 in each memory string and located in the third memory area (page PK-1) or the fourth memory area (page PK-2) will be programmed based on the input data IND or the complement of the input data IND. That is to say, the complementary input data and the input data IND are stored in a complementary manner.

In steps S1120 and S1130, the critical voltage value of the memory cell may be set or programmed to the on state Vt-ON or the cut-off state Vt-OFF. When a read bias voltage is provided for the word line voltage of this memory cell, the memory cell whose critical voltage is the on state Vt-ON allows the current of the memory string to flow through. Relatively speaking, when a read bias voltage is provided to the word line voltage of this memory cell, the memory cell whose critical voltage is the cut-off state Vt-OFF will be cut off without allowing the current of the memory string to flow through.

In step S1140, the memory controller 440 controls a plurality of memory cells in the first memory area (page PM-1) of the first memory sub-block MSB1 and a plurality of memory cells in the third memory area (page PM-2), and simultaneously biases a plurality of memory cells in the second memory area (page PK-1) of the second memory sub-block MSB2 and a plurality of memory cells in the fourth memory area (page PK-2). For detailed implementation of step S1140, please refer to the following FIG. 12 and corresponding embodiments for reference.

In step S1150, the memory controller 440 obtains the output data OUTD according to the plurality of current sensing amplifiers 1020 mentioned above.

In this embodiment, two memory strings (e.g., memory strings ST11 and ST21) that share a bit line are used to perform encoding/decoding operations to generate a bit in the data OUT. Specifically, the memory controller 1030 sets or programs the codec key KEY and the corresponding complement in the corresponding memory cell MCM-1 of the page PM-1 of the memory string ST11 and the corresponding memory cell MCM-2 of the page PM-2 of the memory string ST21 (step S1120), and program the input data and the corresponding complement in the corresponding memory cell MCK-1 of the page PK-1 of the memory string ST11 and the corresponding memory cell MCK-2 of the page PK-2 of the memory string ST21 (step S1130). Accordingly, through the architecture of the memory string and the biasing operation in step S1140, the sum ISL1 of the first current flowing through the memory string ST11 and the second current in the memory string ST21 has the corresponding bit value of the output data OUTD.

Figure 12:
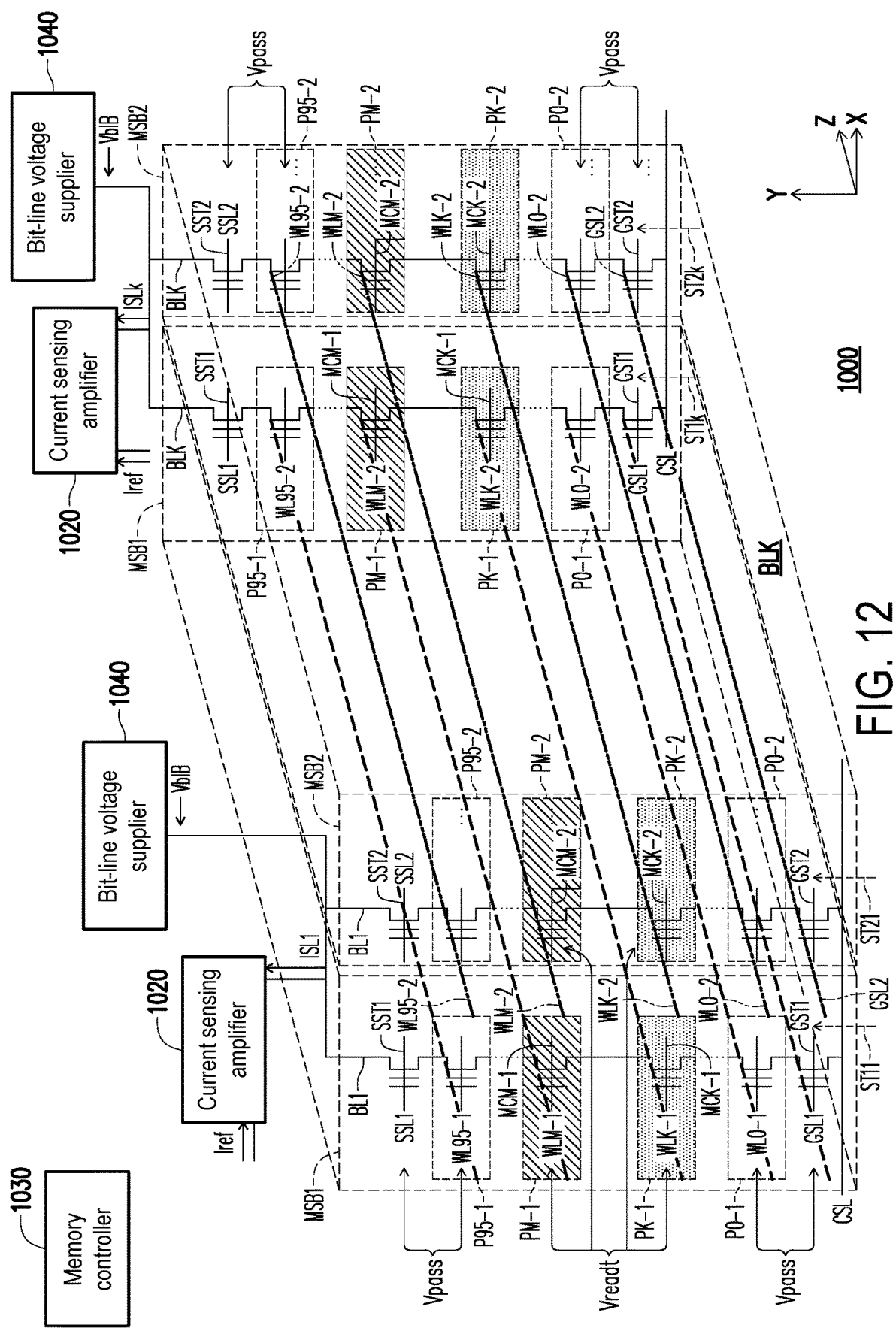
FIG. 12 is a detailed schematic diagram illustrating a device for encryption and decryption and step S1140 of FIG. 11 according to the fourth embodiment of the present disclosure.

FIG. 12 is a detailed schematic diagram illustrating a device 1000 for encryption and decryption and step S1140 of FIG. 11 according to the fourth embodiment of the present disclosure. The details of step S1140 in FIG. 11 may be illustrated through FIG. 12. In step S1140 of FIG. 11, the memory controller 440 biases a plurality of memory cells in the first memory area (page PM-1) and the third memory area (page PM-2) of the first memory sub-block MSB1, and simultaneously biases a plurality of memory cells in the second memory area (page PK-1) and the fourth memory area (page PK-2) of the second memory sub-block MSB2, and the details are as follows.

The memory controller 1030 applies the default bit-line voltage VblB to the bit lines BL1 to BLk through the bit-line voltage supplier 1040 or corresponding hardware. Furthermore, the read voltage Vreadt is applied to the first word line WLM-1 of the first memory area PM-1 of the first memory sub-block MSB1, the second word line WLM-2 of the second memory area PM-2 of the second memory sub-block MSB2, the third word line WLK-1 of the third memory area PK-1 of the first memory sub-block MSB1 and the fourth word line WLK-2 of the fourth memory area PK-2 of the second memory sub-block MSB2. The pass voltage Vpass is applied to other word lines except the first word line WLM-1, the second word line WLM-2, the third word line WLK-1 and the fourth word line WLK-2 in the first memory sub-block MSB1 and the second memory sub-block MSB2. Also, the pass voltage Vpass is applied to the string selection line SSL and the ground selection line GSL of the first memory sub-block MSB1 and the second memory sub-block MSB2.

Figure 13:
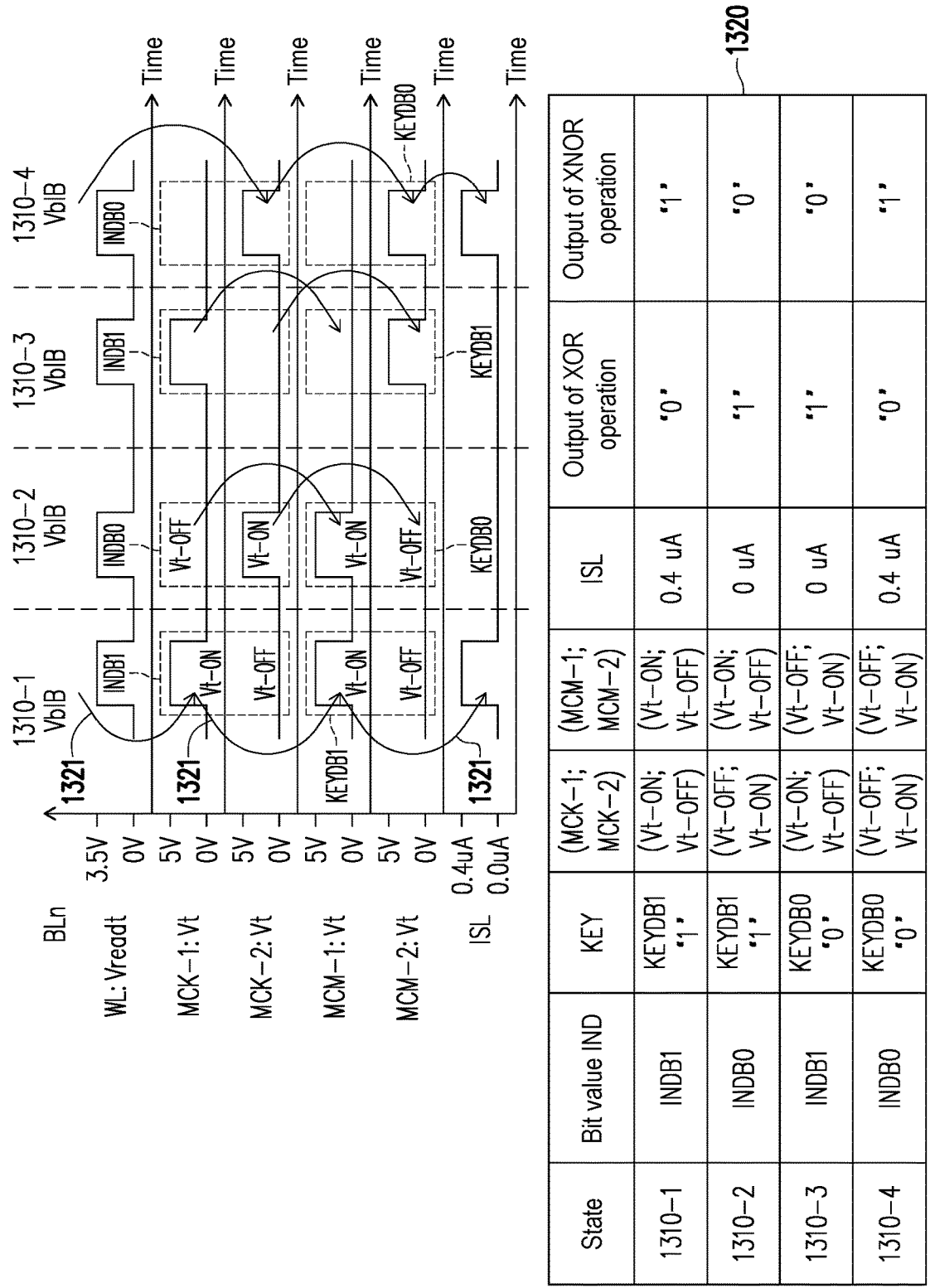
FIG. 13 is a schematic diagram of signals in the device for encryption and decryption in FIG. 10 according to the fourth embodiment of the present disclosure.

FIG. 13 is a schematic diagram of signals in the device for encryption and decryption in FIG. 10 according to the fourth embodiment of the present disclosure. Here, there may be four states 1310-1 to 1310-4, which are categorized based on the corresponding bits of the codec key KEY (for example, the key bit KEYDB1 as the value "1" and the key bit KEYDB0 as the value "0") and the corresponding bits of the input data IND (for example, the input data bit INDB1 as the value "1" and the input data bit INDB0 as the value "0").

In FIG. 13, the state 1310-1 corresponds to the key bit KEYDB1 as the value "1" and the input data bit INDB1 as the value "1". Based on the input data bit INDB1 as the value "1", the critical voltage of the memory cell MCK-1 in the third memory area (page PK-1) is programmed to the on state Vt-ON, and the critical voltage of the memory cell MCK-2 in the fourth memory area (page PK-2) is programmed to the cut-off state Vt-OFF. Based on the key bit KEYDB1 as the value "1", the critical voltage of the memory cell MCM-1 in the first memory area (page PM-1) is programmed to the on state Vt-ON, and the critical voltage of the memory cell MCM-2 in the fourth memory area (page PM-2) is programmed to the cut-off state Vt-OFF.

When the default bit-line voltage VblB is applied to the bit lines BL1 to BLk, and the read voltage Vreadt is applied to the word lines WLM-1 and WLM-2 of the page PM-1 and the page PM-2, since the critical voltages of the memory cell MCM-1 in the first memory area (page PM-1) and the memory cell MCK-1 in the third memory area (page PK-1) on the memory string ST11 are all set/programmed to the on state Vt-ON (for example, arrow 1321 in FIG. 13), the first current flowing through the first memory string ST11 is about 0.4 uA. On the other hand, since the critical voltages of the memory cell MCM-2 in the second memory area (page PM-2) and the memory cell MCK-2 in the fourth memory area (page PK-2) on the memory string ST21 are all programmed to the cut-off state Vt-OFF, the second current of the second memory string ST2 is unable to flow through, and therefore the second current is 0 uA. The sum current ISL of the first current and the second current is about 0.4 uA. Therefore, if the encoding/decoding operation is an XOR operation, the corresponding bit of the output data OUTD generated under the state 1310-1 in FIG. 13 in step S1150 in FIG. 11 is "0". If the encoding/decoding operation is an XNOR operation, the corresponding bit of the output data OUTD generated under the state 1310-1 in FIG. 13 in step S1150 in FIG. 11 is "1".

In FIG. 13, the state 1310-2 corresponds to the key bit KEYDB1 as the value "1" and the input data bit INDB0 as the value "0". Based on the input data bit INDB0 as the value "0", the critical voltage of the memory cell MCK-1 in the third memory area (page PK-1) is programmed to the cut-off state Vt-OFF, and the critical voltage of the memory cell MCK-2 in the fourth memory area (page PK-2) is programmed to the on state Vt-ON. Based on the key bit KEYDB1 as the value "1", the critical voltage of the memory cell MCM-1 in the first memory area (page PM-1) is programmed to the on state Vt-ON, and the critical voltage of the memory cell MCM-2 in the fourth memory area (page PM-2) is programmed to the cut-off state Vt-OFF.

When the default bit-line voltage VblB is applied to the bit lines BL1 to BLk, and the read voltage Vreadt is applied to the word lines WLM-1 and WLM-2 of the page PM-1 and the page PM-2, since the critical voltage of the memory cell MCK-1 in the third memory area (page PK-1) on the first memory string ST11 is programmed to the cut-off state Vt-OFF, the first current flowing through the first memory string ST11 is unable to flow through, and therefore the first current is 0 uA. On the other hand, since the critical voltage of the memory cell MCM-2 in the second memory area (page PM-2) on the second memory string ST21 is programmed to the cut-off state Vt-OFF, the second current of the second memory string ST2 is unable to flow through, and therefore the second current is 0 uA. The sum current ISL of the first current and the second current is 0 uA. Therefore, if the encoding/decoding operation is an XOR operation, the corresponding bit of the output data OUTD generated under the state 1310-2 in FIG. 13 in step S1150 in FIG. 11 is "1". If the encoding/decoding operation is an XNOR operation, the corresponding bit of the output data OUTD generated under the state 1310-1 in FIG. 13 in step S1150 in FIG. 11 is "0".

By analogy, in FIG. 13, the state 1310-3 corresponds to the key bit KEYDB0 as the value "0" and the input data bit INDB1 as the value "1". When the bit lines BL1 to BLk are applied with the default bit-line voltage VblB, and the word lines WLM-1 and WLM-2 of the page PM-1 and page PM-2 are applied with the read voltage Vreadt, the first current and the second current are 0 uA respectively, and therefore the sum current ISL is 0 uA. If the encoding/decoding operation is an XOR operation, the corresponding bit of the output data OUTD generated under the state 1310-3 in FIG. 13 in step S1150 in FIG. 11 is "1". If the encoding/decoding operation is an XNOR operation, the corresponding bit of the output data OUTD generated under the state 1310-3 in FIG. 13 in step S1150 in FIG. 11 is "0".

In FIG. 13, the state 1310-4 corresponds to the key bit KEYDB0 as the value "0" and the input data bit INDB1 as the value "1". When the bit lines BL1 to BLk are applied with the default bit-line voltage VblB, and the word lines WLM-1 and WLM-2 of the page PM-1 and page PM-2 are applied with the read voltage Vreadt, the first current is 0 uA and the second current is about 0.4 uA (because the critical voltage of the memory cell MCK-2 in the page PK-2 is programmed to the on state Vt-ON, and the critical voltage of the memory cell MCM-2 in the page PM-2 is programmed to the on state Vt-ON), and therefore the sum current ISL is 0.4 uA. If the encoding/decoding operation is an XOR operation, the corresponding bit of the output data OUTD generated under the state 1310-4 in FIG. 13 in step S1150 in FIG. 11 is "0". If the encoding/decoding operation is an XNOR operation, the corresponding bit of the output data OUTD generated under the state 1310-4 in FIG. 13 in step S1150 in FIG. 11 is "1". It may be seen from the waveform diagram and truth table 1320 of FIG. 13 that computing in memory may be implemented in the memory array through the hardware and steps of FIG. 10, FIG. 11 and FIG. 12, thereby encrypting/decrypting data.

To sum up, the device for encryption and decryption and the method for processing data in the embodiments of the present disclosure configure the codec key, input data and corresponding complements respectively in the corresponding memory cells of the memory string architecture in the memory array, or configure them on the bit-line voltages of the corresponding memory strings, and use the data-sensing circuit to sense the current values on these memory strings to perform computing in memory (CIM), thereby achieving large-scale parallelism (e.g., it may be 8 kB per memory sub-block/per page) and fine-grained data encoding/decoding technology. The aforementioned codec key may be implemented through the PUF data generated by the physically unclonable function (PUF) processing operation of the memory array without transmitting the codec key. In addition, the aforementioned PUF data does not need to be stored in a specific area (i.e., there is no storage overhead), but may be generated or invoked through the aforementioned PUF processing operation when performing the aforementioned encoding/decoding operation.

Although the present disclosure has been disclosed above through embodiments, it is not intended to limit the present disclosure. Anyone with ordinary knowledge in the technical field can make some modifications and refinement without departing from the spirit and scope of the present disclosure. Therefore, the scope to be protected by the present disclosure shall be determined by the appended claims.

What is claimed is:

1. A device for encryption and decryption, comprising:
a memory array comprising a memory block, wherein the memory block comprises a first memory string with a first bit-line and a second memory string with a second bit-line, the first memory string and the second memory string comprise a plurality of memory cells, and the memory cells are divided into a plurality of memory areas;
a data-sensing circuit, wherein the data-sensing circuit is coupled to the first memory string and the second memory string;
a bit-line voltage supplier coupled to the first bit-line and the second bit-line; and
a memory controller coupled to the memory block, wherein the memory controller is configured to:
obtain a codec key, wherein memory cells in a first memory sub-area of a default memory area are set according to the codec key, and memory cells in a second memory sub-area of the plurality of memory areas are programed according to a complementary codec key;
obtain an input data;
generate bit-line voltages of the first bit-line and the second bit-line through the bit-line voltage supplier according to the input data, wherein the bit-line voltage of the first bit-line is different from the bit-line voltage of the second bit-line;
bias the memory cells in the first memory sub-area and the second memory sub-area; and
obtain an output data according to the data-sensing circuit.

2. The device for encryption and decryption according to claim 1, wherein the step of generating the bit-line voltages of the first bit-line and the second bit-line through the bit-line voltage supplier according to the input data comprises:
when a corresponding bit value of the input data is a first value, a first default voltage is applied to the first bit-line, and a second default voltage is applied to the second bit-line; and
when a corresponding bit value of the input data is a second value, the second default voltage is applied to the first bit-line, and the first default voltage is applied to the second bit-line.

3. The device for encryption and decryption according to claim 1, wherein the first memory sub-area and the second memory sub-area are both located in the default memory area,
wherein the step of biasing the memory cells in the first memory sub-area and the second memory sub-area through the memory controller comprises:
applying a read bias voltage to a word line of the default memory area;
applying a pass voltage to other word lines in the memory block except the word line of the default memory area; and
applying the pass voltage to a string selection line and a ground selection line of the memory block.

4. The device for encryption and decryption according to claim 1, wherein the step of obtaining the input data through the memory controller comprises:
performing a physically unclonable function (PUF) processing operation on a specific area of the memory block to generate PUF data in the memory area, wherein the PUF data is configured to generate the codec key.

5. The device for encryption and decryption according to claim 4, wherein the PUF processing operation is one of a gate-induced drain leakage (GIDL) erase operation, a program interference operation, a program disturbance operation, a read interference operation, a read disturbance operation, a program delay operation, and an erase delay operation.

6. The device for encryption and decryption according to claim 1, wherein the step of obtaining the codec key comprises:
generating the codec key according to a key generating device; and
transmitting the codec key from the key generating device to the device for encryption and decryption.

7. The device for encryption and decryption according to claim 1, wherein the output data is a result of an XOR operation or an XNOR operation between the codec key and the input data.

8. The device for encryption and decryption according to claim 1, wherein the memory area is one page of a plurality of pages of the memory block or a part of the page, and the memory cells in the page are coupled to a same word line,
wherein the first memory sub-area is a set of odd-numbered bits in the default memory area, and the second memory sub-area is a set of even-numbered bits in the default memory area.

9. The device for encryption and decryption according to claim 1, wherein the data-sensing circuit comprises:
a current sensing amplifier simultaneously coupled to the first memory string and the second memory string,
wherein the current sensing amplifier is configured to compare a reference current and a sum of a first current flowing through the first memory string and a second current flowing through the second memory string to obtain the output data.

10. The device for encryption and decryption according to claim 1, wherein the data-sensing circuit comprises:
a first current sensing amplifier coupled to the first memory string, wherein the first current sensing amplifier compares a first reference current with a first current flowing through the first memory string to obtain a first result;
a second current sensing amplifier coupled to the second memory string, wherein the second current sensing amplifier compares a second reference current with a second current flowing through the second memory string to obtain a second result; and
a logic circuit comprising an OR gate, wherein a first input terminal of the OR gate receives the first result, a second input terminal of the OR gate receives the second result, and, an output node of the OR gate generates the output data.

11. A method for processing data, comprising:
providing a memory block, wherein the memory block comprises a first memory string with a first bit-line and a second memory string with a second bit-line, the first memory string and the second memory string comprise a plurality of memory cells, and the memory cells are divided into a plurality of memory areas;

obtaining a codec key, wherein memory cells in a first memory sub-area of a default memory area are set according to the codec key, and memory cells in a second memory sub-area of the plurality of memory areas are programed according to a complementary codec key;

obtaining an input data;

generating bit-line voltages of the first bit-line and the second bit-line through a bit-line voltage supplier according to the input data, wherein the bit-line voltage of the first bit-line is different from the bit-line voltage of the second bit-line;

biasing the memory cells in the first memory sub-area and the second memory sub-area; and obtaining an output data according to a data-sensing circuit, wherein the data-sensing circuit is coupled to the first memory string and the second memory string.

12. The method according to claim 11, wherein the step of generating the bit-line voltages of the first bit-line and the second bit-line through the bit-line voltage supplier according to the input data comprises:

when a corresponding bit value of the input data is a first value, a first default voltage is applied to the first bit-line, and a second default voltage is applied to the second bit-line; and when a corresponding bit value of the input data is a second value, the second default voltage is applied to the first bit-line, and the first default voltage is applied the second bit-line.

13. The method according to claim 11, wherein the first memory sub-area and the second memory sub-area are both located in the default memory area, wherein the step of biasing the memory cells in the first memory sub-area and the second memory sub-area comprises:

applying a read bias voltage to a word line of the default memory area;

applying a pass voltage to other word lines in the memory block except the word line of the default memory area; and applying the pass voltage to a string selection line and a ground selection line of the memory block.

14. A device for encryption and decryption, comprising:

a memory array comprising a memory block, wherein the memory block comprises a first memory sub-block and a second memory sub-block, the first memory sub-block comprises a plurality of first memory strings and the second memory sub-block comprises a plurality of second memory strings, one of the first memory strings and one of the second memory strings are connected and share one of a plurality of bit lines, the first memory string and the second memory string comprise a plurality of memory cells, and the memory cells are divided into a plurality of memory areas;

a plurality of current sensing amplifiers respectively coupled to the bit lines; and a memory controller coupled to the memory array, wherein the memory controller is configured to:

obtain a codec key, wherein memory cells in a first memory area of the first memory sub-block are set according to the codec key, and memory cells in a second memory area of the second memory sub-block are programmed according to a complementary codec key;

obtain an input data, wherein memory cells in a third memory area of the first memory sub-block are programmed according to the input data, and memory cells in a fourth memory area of the second memory sub-block are programmed according to a complementary input data;

bias the memory cells in the first memory area and the memory cells in the third memory area of the first memory sub-block, and simultaneously bias the memory cells in the second memory area and the memory cells in the fourth memory area of the second memory sub-block; and obtain an output data according to the current sensing amplifier.

15. The device for encryption and decryption according to claim 14, wherein the step of biasing the memory cells in the first memory area and the memory cells in the third memory area of the first memory sub-block, and simultaneously biasing the memory cells in the second memory area and the memory cells in the fourth memory area of the second memory sub-block comprises:

applying a default bit-line voltage to the bit lines;

applying a read voltage to a first word line of the first memory area of the first memory sub-block, a second word line of the second memory area of the second memory sub-block, a third word line of the third memory area of the first memory sub-block and a fourth word line of the fourth memory area of the second memory sub-block;

applying a pass voltage to other word lines in the first memory sub-block and the second memory sub-block except the first word line to the fourth word line; and applying the pass voltage to a string selection line and a ground selection line of the first memory sub-block and the second memory sub-block.

16. The device for encryption and decryption according to claim 14, wherein the step of obtaining the input data through the memory controller comprises:

performing a physically unclonable function (PUF) processing operation on a specific area of the memory block to generate PUF data in the memory area, wherein the PUF data is configured to generate the codec key.

17. The device for encryption and decryption according to claim 16, wherein the PUF processing operation is one of a gate-induced drain leakage (GIDL) erase operation, a program interference operation, a program disturbance operation, a read interference operation, a read disturbance operation, a program delay operation, and an erase delay operation.

18. The device for encryption and decryption according to claim 14, wherein the step of obtaining the codec key comprises:

generating the codec key according to a key generating device; and transmitting the codec key from the key generating device to the device for encryption and decryption.

19. The device for encryption and decryption according to claim 14, wherein the output data is a result of an XOR operation or an XNOR operation between the codec key and the input data.

20. The device for encryption and decryption according to claim 14, wherein each of the memory area is one page of a plurality of pages of the memory block or a part of the page, and the memory cells in the page are coupled to a same word line, and the complementary codec key and the codec key are stored in a complementary manner, and the complementary input data and the input data are stored in the complementary manner.

21. The device for encryption and decryption according to claim 14, wherein the first memory sub-block is adjacent to the second memory sub-block,
wherein the first memory area is adjacent to the third memory area, and the second memory is adjacent to the fourth memory area.

22. A method for processing data, comprising:
providing a memory block, wherein the memory block comprises a first memory sub-block and a second memory sub-block, and the first memory sub-block comprises a plurality of first memory strings and the second memory sub-block comprises a plurality of second memory strings, one of the first memory strings and one of the second memory strings are connected and share one of a plurality of bit lines, the first memory string and the second memory string comprise a plurality of memory cells, and the memory cells are divided into a plurality of memory areas;
obtaining a codec key, wherein memory cells in a first memory area of the first memory sub-block are set according to the codec key, and memory cells in a second memory area of the second memory sub-block are programmed according to a complementary codec key;
obtaining an input data, wherein memory cells in a third memory area of the first memory sub-block are programmed according to the input data, and memory cells in a fourth memory area of the second memory sub-block are programmed according to a complementary input data;
biasing the memory cells in the first memory area and the memory cells in the third memory area of the first memory sub-block, and simultaneously biasing the memory cells in the second memory area and the memory cells in the fourth memory area of the second memory sub-block; and
obtaining an output data according to the current sensing amplifier, wherein the current sensing amplifier is coupled to the bit lines respectively.

23. The method according to claim 22, wherein the step of biasing the memory cells in the first memory area and the memory cells in the third memory area of the first memory sub-block, and simultaneously biasing the memory cells in the second memory area and the memory cells in the fourth memory area of the second memory sub-block comprises:
applying a default bit-line voltage to the bit lines;
applying a read voltage to a first word line of the first memory area of the first memory sub-block, a second word line of the second memory area of the second memory sub-block, a third word line of the third memory area of the first memory sub-block and a fourth word line of the fourth memory area of the second memory sub-block;
applying a pass voltage to other word lines in the first memory sub-block and the second memory sub-block except the first word line to the fourth word line; and
applying the pass voltage to a string selection line and a ground selection line of the first memory sub-block and the second memory sub-block.

24. The method according to claim 22, wherein the step of obtaining the input data through comprises:
performing a physically unclonable function (PUF) processing operation on a specific area of the memory block to generate PUF data in the memory area, wherein the PUF data is configured to generate the codec key.

25. The method according to claim 24, wherein the PUF processing operation is one of a gate-induced drain leakage (GIDL) erase operation, a program interference operation, a program disturbance operation, a read interference operation, a read disturbance operation, a program delay operation, and an erase delay operation.

26. The method according to claim 22, wherein the step of obtaining the codec key comprises:
generating the codec key according to a key generating device; and
transmitting the codec key from the key generating device to the device for encryption and decryption.

27. The method according to claim 22, wherein the output data is a result of an XOR operation or an XNOR operation between the codec key and the input data.

* * * * *